US010382543B2

(12) United States Patent
Gampel et al.

(10) Patent No.: US 10,382,543 B2
(45) Date of Patent: Aug. 13, 2019

(54) SYSTEM AND DEVICE FOR ENABLING ANY NETWORK FUNCTIONALITY CLIENT OR SERVER IN A HTML5 APPLICATION

(71) Applicant: Huawei Technologies Co., Ltd., Shenzhen, Guangdong (CN)

(72) Inventors: Eran Gampel, Munich (DE); Adi Molkho, Munich (DE); Eyal Shraga, Munich (DE); Amnon Senderovich, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 503 days.

(21) Appl. No.: 15/049,328

(22) Filed: Feb. 22, 2016

(65) Prior Publication Data

US 2016/0205185 A1    Jul. 14, 2016

Related U.S. Application Data

(63) Continuation of application No. PCT/EP2013/067582, filed on Aug. 23, 2013.

(51) Int. Cl.
*H04L 29/08* (2006.01)
*H04L 29/12* (2006.01)
*H04L 29/06* (2006.01)

(52) U.S. Cl.
CPC ...... *H04L 67/1095* (2013.01); *H04L 61/2007* (2013.01); *H04L 67/02* (2013.01); *H04L 69/08* (2013.01)

(58) Field of Classification Search
CPC .................................................. H04L 67/1095
See application file for complete search history.

(56) References Cited

U.S. PATENT DOCUMENTS 7,921,225 B2    4/2011  Bonefas et al.
9,794,304 B2 *  10/2017 Fallows .............. H04L 65/1069
(Continued)

FOREIGN PATENT DOCUMENTS

CN      102893270 A    1/2013
JP      2003058496 A   2/2003
(Continued)

OTHER PUBLICATIONS

Shimizu et al., "Web Architecture for Sensor Data Integration", Multimedia, Distributed, Cooperative, and Mobile (DICOM02013) Symposium Series, Information Processing Society of Japan, Jul. 10, 2013, vol. 2013, No. 2, pp. 1065-1070, (Partial translation).

*Primary Examiner* — Jimmy H Tran

(57) ABSTRACT

Systems and devices for enabling any network functionality client or server in a HTML5 application. A Network Entity running as a HTML5 Application (NEHA) is for use in a system comprising a HTTP server, a network entity (NE) and a mirror network entity (MNE). The MNE is a mirror instance of the NE and a desired network protocol is run between the MNE and the NE. The NEHA includes a processor configured to create a first request for requesting the MNE, wherein the first request indicates the desired network protocol, send the first request to the HTTP server, receive a first response indicating the MNE from the HTTP server, process the first response, and communicate with the NE through the MNE using the desired network protocol.

20 Claims, 15 Drawing Sheets

(56) References Cited

U.S. PATENT DOCUMENTS

| | | | |
|---|---|---|---|
| 9,866,656 B2* | 1/2018 | Siegman | H04L 69/162 |
| 2002/0052968 A1* | 5/2002 | Bonefas | H04L 1/1635 |
| | | | 709/231 |
| 2003/0074448 A1* | 4/2003 | Kinebuchi | H04L 29/06 |
| | | | 709/225 |
| 2007/0143488 A1* | 6/2007 | Pantalone | H04L 63/08 |
| | | | 709/230 |
| 2007/0274327 A1* | 11/2007 | Kaarela | H04L 12/2836 |
| | | | 370/401 |
| 2009/0094317 A1* | 4/2009 | Venkitaraman | H04L 29/12311 |
| | | | 709/203 |
| 2010/0281107 A1* | 11/2010 | Fallows | G06F 9/54 |
| | | | 709/203 |
| 2010/0306547 A1* | 12/2010 | Fallows | G06F 21/305 |
| | | | 713/178 |
| 2010/0332328 A1* | 12/2010 | Dharmaji | G06Q 30/02 |
| | | | 705/14.64 |
| 2012/0151373 A1* | 6/2012 | Kominac | G06F 17/30905 |
| | | | 715/740 |
| 2013/0070780 A1* | 3/2013 | Hozumi | H04B 7/15542 |
| | | | 370/437 |
| 2013/0262978 A1* | 10/2013 | Reshadi | G06F 17/272 |
| | | | 715/234 |
| 2014/0129920 A1* | 5/2014 | Sheretov | G06F 17/30873 |
| | | | 715/234 |
| 2014/0237119 A1* | 8/2014 | Chung | H04L 67/02 |
| | | | 709/226 |
| 2014/0280907 A1* | 9/2014 | Rothstein | H04L 43/18 |
| | | | 709/224 |
| 2015/0020132 A1* | 1/2015 | Willis | H04L 47/76 |
| | | | 725/110 |
| 2015/0180963 A1* | 6/2015 | Luecke | H04L 67/06 |
| | | | 709/203 |
| 2015/0193405 A1* | 7/2015 | Gensburg | G06F 11/3692 |
| | | | 715/220 |
| 2015/0207904 A1* | 7/2015 | Siegman | H04N 21/2343 |
| | | | 709/217 |
| 2015/0295994 A1* | 10/2015 | Siegman | G06F 17/30076 |
| | | | 709/203 |
| 2015/0326454 A1* | 11/2015 | Geis | H04L 67/1063 |
| | | | 709/226 |
| 2016/0070813 A1* | 3/2016 | Unter Ecker | G06F 16/986 |
| | | | 715/234 |
| 2016/0099984 A1* | 4/2016 | Karagiannis | H04L 51/046 |
| | | | 709/206 |
| 2016/0165276 A1* | 6/2016 | Toma | H04H 20/93 |
| | | | 725/116 |
| 2017/0031804 A1* | 2/2017 | Ciszewski | H04L 67/22 |
| 2017/0054766 A1 | 2/2017 | Fallows et al. | |

FOREIGN PATENT DOCUMENTS

| | | | | |
|---|---|---|---|---|
| JP | 2013065223 A | 4/2013 | | |
| WO | WO 2012/144919 A2 | 10/2012 | | |
| WO | WO 2012144919 A2 * | 10/2012 | | H04L 63/0807 |

* cited by examiner

SYSTEM AND DEVICE FOR ENABLING ANY NETWORK FUNCTIONALITY CLIENT OR SERVER IN A HTML5 APPLICATION

CROSS-REFERENCE TO RELATED APPLICATION

This application is a continuation of International Application No, PCT/EP2013/067582, filed on Aug. 23, 2013, which is hereby incorporated by reference in its entirety.

TECHNICAL FIELD

The present disclosure relates to a system and device for enabling any network functionality client or server in a standard HTML5 application.

BACKGROUND

Web-browsers today are, for the most part, HTTP client entities, all the communication is initiated from the browser and there is no option of running a web server in a browser. Further more there is no option of acting as a network client (beside HTTP client and WebSocket client) in a HTML5 application running in a browser without installing additional plug-ins. When initiating communication by the web-browser, native applications or special plugins have to be installed per browser and per operating system (OS) and sometimes per service type. Such an installation is complex to handle as each operating system, each browser and each service type requires for an individual installation procedure.

SUMMARY

It is the object of the disclosure to provide a technique for expanding the functionality of HTML5 applications.

This object is achieved by the features of the independent claims. Further implementation forms are apparent from the dependent claims, the description and the figures.

In order to describe the disclosure in detail, the following teens, abbreviations and notations will be used:

web socket: web socket or WebSocket in English, the web socket is a web technology providing full-duplex communications channels over a single TCP connection. The WebSocket protocol was standardized by the IETF as RFC 6455 in 2011, and the WebSocket API in Web IDL is being standardized by the World Wide Web Consortium (W3C).

HTTP: Hypertext Transfer Protocol in English, the Hypertext Transfer Protocol is an application protocol for distributed, collaborative, hypermedia information systems. HTTP is the foundation of data communication for the World Wide Web (WWW).

HTML5: Hypertext Transfer Protocol version 5 in English, the Hypertext Transfer Protocol version 5 is a markup language for structuring and presenting content for the World Wide Web and a core technology of the Internet. It is the fifth revision of the HTML and is a W3C Candidate Recommendation. Its core aims have been to improve the language with support for the latest multimedia while keeping it easily readable by humans and consistently understood by computers and devices such as web browsers, parsers, etc.; examples for protocols supported by HTML5 are: HTTP client, WebSocket, webRTC.

NS Protocol: Network server protocol in English, the network server protocol is a protocol that is not supported by the HTML5.

WebRTC: Web Real-Time Communication in English, the Web Real-Time Communication is an API definition being drafted by the World Wide Web Consortium (W3C) to enable browser to browser applications for voice calling, video chat and point-to-point (P2P) file sharing without plugins.

OS: Operating system in English, the operating system is a collection of software that manages hardware resources and provides common services for computer programs. The operating system is a vital component of the system software. Application programs usually require an operating system to function.

SOAP: Simple Object Access Protocol in English, the Simple Object Access Protocol is a protocol specification for exchanging structured information in the implementation of web services in computer networks. It relies on XML Information Set for its message format, and usually relies on other Application Layer protocols, most notably Hypertext Transfer Protocol (HTTP) or Simple Mail Transfer Protocol (SMTP), for message negotiation and transmission.

REST: Representational State Transfer in English, the Representational State Transfer is a style of software architecture for distributed systems such as the World Wide Web. REST has emerged as a predominant web API design model.

CGI: Common Gateway Interface in English, the Common Gateway Interface is a standard method for web server software to delegate the generation of web content to executable files. Such files are known as CGI scripts or simply CGIs; they are usually written in a scripting language.

DLNA: Digital Living Network Alliance in English. The Digital Living Network Alliance is a non-profit collaborative trade organization that is responsible for defining interoperability guidelines to enable sharing of digital media between multimedia devices. These guidelines specify a set of restricted ways of using the standards to achieve interoperability. The interoperability guidelines enable sharing of digital media such as music, photos and videos between consumer devices such as computers, TVs, printers, cameras, cell phones, and other multimedia devices.

DMR: Digital Media Receiver in English, the Digital Media Receiver is also commonly referred to as a media extender, media streamer, digital media hub, or digital media adapter (DMA), is a home entertainment device that can connect to a home network to retrieve digital media files (such as music, pictures, or video) from a personal computer or other networked media server and play them back on a home theater system or TV. The DLNA organization refers to these devices as digital media renderers (DMR).

SSDP: Simple Service Discovery Protocol in English, the Simple Service Discovery Protocol is a network protocol based on the Internet Protocol Suite for advertisement and discovery of network services and presence information. It accomplishes this without assistance of server-based configuration mechanisms, such as the Dynamic Host Configuration Protocol (DHCP) or the Domain Name System (DNS), and without special static configuration of a network host. SSDP is the basis of the discovery protocol of Universal Plug and Play and is intended for use in residential or small office environments. SSDP was incorporated into the UPnP protocol stack.

GENA: General Event Notification Architecture in English. The General Event Notification Architecture defines an HTTP notification architecture that transmits notifications between HTTP resources. An HTTP resource could be any object which might need to send or receive a notification, for example a distribution list, buddy list, print job, etc. GENA Base Client to Arbiter provides for the ability to send and receive notifications using HTTP over TCP/IP and administratively scoped unreliable multicast UDP.

IGMP: Internet Group Management Protocol in English, the Internet Group Management Protocol is a communications protocol used by hosts and adjacent routers on IP networks to establish multicast group memberships. IGMP is an integral part of IP multicast. IGMP can be used for one-to-many networking applications such as online streaming video and gaming, and allows more efficient use of resources when supporting these types of applications.

IPTV: Internet Protocol Television in English, the Internet Protocol Television is a system through which television services are delivered using the Internet protocol suite over a packet-switched network such as the Internet, instead of being delivered through traditional terrestrial, satellite signal, and cable television formats.

WSDL: Web Services Description Language in English, the Web Services Description Language is an XML-based interface description language that is used for describing the functionality offered by a web service. A WSDL description of a web service (also referred to as a WSDL file) provides a machine-readable description of how the service can be called, what parameters it expects, and what data structures it returns.

XML: Extensible Markup Language in English, the Extensible Markup Language is a markup language that defines a set of rules for encoding documents in a format that is both human-readable and machine-readable.

GUI: Graphical User Interface in English, the Graphical User Interface is a type of user interface that allows users to interact with electronic devices using images rather than text commands. GUIs can be used in computers, hand-held devices such as MP3 players, portable media players or gaming devices, household appliances, office, and industry equipment.

API: Application Programming Interface in English, the Application Programming Interface is a specification of how some software components should interact with each other. In practice in most of the cases an API is a library that usually includes specification for routines, data structures, object classes, and variables.

Scripting Language: A scripting language or script language in English, is a programming language that supports the writing of scripts, programs written for a special runtime environment that can interpret and automate the execution of tasks which could alternatively be executed one-by-one by a human operator. Environments that can be automated through scripting include software applications, web pages within a web browser, the shells of operating systems (OS), and several general purpose and domain-specific languages such as those for embedded systems.

JavaScript™: JavaScript (JS) in English, is an interpreted computer programming language. It was originally implemented as part of web browsers so that client-side scripts could interact with the user, control the browser, communicate asynchronously, and alter the document content that was displayed. More recently, however, it has become common in both game development and the creation of desktop applications.

Bonjour: Bonjour is Apple's implementation of Zero configuration networking, a group of technologies that includes service discovery, address assignment, and host-name resolution. Bonjour locates devices such as printers, other computers, and the services that those devices offer on a local network using multicast Domain Name System (mDNS) service records.

AirPlay: AirPlay is a proprietary protocol stack/suite developed by Apple Inc. that allows wireless streaming of audio, video, and photos, together with related metadata between devices.

UPnP: Universal Plug and Play in English, the Universal Plug and Play is a set of networking protocols that permits network devices, such as personal computers, printers, Internet gateways, Wi-Fi access points and mobile devices to seamlessly discover each other's presence on the network and establish functional network services for data sharing, communications, and entertainment. UPnP is intended primarily for residential networks without enterprise class devices.

DMC: Digital Media Controllers in English, the Digital Media Controllers is according to a DLNA Certified Device Class. The Digital Media Controller finds content on digital media servers (DMS) and instructs digital media renderers (DMR) to play the content. Content doesn't stream from or through the DMC. Examples include Internet tablets, Wi-Fi enabled digital cameras and smartphones.

RUIS: Remote User Interface Server—Http server.

RTSP: Real Time Streaming Protocol in English. The Real Time Streaming Protocol is a network control protocol designed for use in entertainment and communications systems to control streaming media servers. The protocol is used for establishing and controlling media sessions between end points. Clients of media servers issue VCR-like commands, such as play and pause, to facilitate real-time control of playback of media files from the server.

RTMP: Real Time Messaging Protocol in English, the Real Time Messaging Protocol is a protocol for streaming audio, video and data over the Internet, between a Flash player and a server.

XMPP: Extensible Messaging and Presence Protocol in English, the Extensible Messaging and Presence Protocol is a communications protocol for message-oriented middleware based on XML (Extensible Markup Language). The protocol was originally developed for near real-time, instant messaging (IM), presence information, and contact list maintenance. Designed to be extensible, the protocol has also been used for publish-subscribe systems, signaling for VoIP, video, file transfer, gaming, etc.

URI: Uniform Resource Identifier in English, the Uniform Resource Identifier is a string of characters used to identify a name or a web resource. Such identification enables interaction with representations of the web resource over a network (typically the World Wide Web) using specific protocols.

According to a first aspect, a Network Entity running as a HTML5 Application (NEHA) is provided. The NEHA is used in a system comprising a HTTP server, a network entity (NE) and a mirror network entity (MNE) 120, wherein the MNE 120 is a mirror instance of the NE, a desired network protocol is run between the NNE 120 and the NE. The NEHA comprises: a first sender 1320 configured for sending a first request to the HTTP server for requesting the MNE 120, wherein the first request indicates the desired network protocol; a first receiver 1310 configured for receiving a first response indicating the MNE 120 from the HTTP server; a processing logic 1350 configured for creating the first request and processing the first response and a communicating unit 1330 configured for communicating with the NE through the MNE 120.

By communicating with the NE through the MNE 120, the NEHA is enabled to communicate with the NE which runs a desired network protocol without the requirement of installing native applications or special plugins per browser and per operating system (OS) or per service type on the NEHA. The functionality of the NEHA is expanded to the desired network protocol not supported by HTML5. The mirror network entity MNE 120 is also referred as mirrored device.

In a first possible implementation form of the NEHA according to the first aspect as such the communicating unit 1330 comprises a second sender 1333 configured for sending a message to the MNE 120; and a second receiver 1331 configured for receiving a message from the MNE 120; the processing logic 1350 is further configured for processing the message received from the MNE 120 and creating the message sent to the NNE 120.

In a second possible implementation form of the NEHA according to the first implementation form of the first aspect, when the NEHA is a client entity for requesting a first service, the NE is a server entity providing the first service, wherein the message sent to the MNE 120 is a second request for requesting the first service, the message received from the MNE 120 is a second response providing the first service. The second request and the second response are messages defined in the desired network protocol, taking the IGMP as an example, when the second request is the Join Group Request for a multicast group, the second response is the Join Group Reply; when the second request is the Leave Group Request, the second response is the Leave Group Reply.

By doing this, the NEHA is enabled to be a client entity for requesting a service and to act as a network client device for any network protocols that is not supported by the HTML5.

In a third possible implementation form of the NEHA according to the second implementation form of the first aspect, the desired network protocol comprises network protocols not supported by HTML5, in particular the Internet Group Management Protocol, IGMP, Internet Protocol Television, IPTV, group protocols, and the File Transfer Protocol, FTP.

The NEHA is enabled to run as any network protocol client that is not supported by the HTML5 in a HTML5 application by introducing the MNE 120. For instance, the NEHA is enable to run an IGMP client in a HTML5 browser.

In a fourth possible implementation form of the NEHA according to the first implementation form of the first aspect as such, when the NEHA is a server entity for providing a second service, the NE is a client entity requesting the second service, wherein the message received from the MNE 120 is a third request for requesting the second service, the message sent to the MNE 120 is a third response providing the second service. Similarly to the second request/response, the third request/response is also the well known message of the desired network protocol.

The NEHA is enabled to be a server entity for providing a service.

In a fifth possible implementation form of the NEHA according to the fourth implementation form of the first aspect, the desired network protocol comprises HTTP, auto discovery and control network protocol, and media auto discovery and control network protocol.

The auto discovery and control network protocol comprises the UPnP group protocols, and Bonjour. The auto discovery & control (UPnP, Bonjour etc.) function is enabled in a HTML5 application by introducing the MNE 120.

The media auto discovery and control network protocol comprises media UPnP group protocols, AirPlay and DLNA protocol. The UPnP media renderer and DLNA Media Player DMR function are enabled in a HTML5 application by introducing the MNE 120.

When the desired network protocol is the auto discovery and control network protocol, the NEHA is an auto discovery and control network device; when the desired network protocol is the media auto discovery and control network protocol, the NEHA is a media auto discovery and control network renderer device.

In a sixth possible implementation form of the NEHA according to the first aspect as such or any one of the preceding implementation forms of the first aspect, the NEHA further comprises a connection establishing unit 1340 coupled to the communicating unit 1330, configured for establishing a persistent connection between the NEHA and the MNE 120, accordingly the message sent the MNE (120) to and the message received from the MNE 120 are transferred over the persistent connection.

In another possible implementation form of the NEHA according the first aspect as such or any one of the preceding implementation forms of the first aspect, the persistent connection is a WebSocket persistent connection, in particular a HTML5 WebSocket persistent connection or a secure link connection. The secure link connection may be an encrypted secure link connection. The WebSocket persistent connection may be a bi-direction WebSocket persistent connection.

In another possible implementation form of the NEHA according the first aspect as such or any one of the preceding implementation forms of the first aspect, the persistent connection provides scripting language interfaces, for instance, JavaScript interfaces.

In another possible implementation form of the NEHA according the first aspect as such or any one of the preceding implementation forms of the first aspect, the NEHA 110 comprises a web browser 210 configured to communicating with the NE through the MNE 120, such as sending the message to the MNE 120. The web browser is a HTML5 browser.

The web browser 210 comprises a HTML5 application configured to send the message to the MNE 120.

In a seventh possible implementation form of the NEHA according to the first aspect as such or any one of the preceding implementation forms of the first aspect, a first network protocol is run between the NEHA and the MNE 120.

In an eighth possible implementation form of the NEHA according to seventh implementation form of the first aspect, the first network protocol comprises at least one of the desired network protocol and a private protocol.

In another possible implementation form of the NEHA according the first aspect as such or any one of the preceding implementation forms of the first aspect, a HTTP protocol is run between the NEHA and the HTTP server, accordingly the first request and the first response are of the HTTP protocol.

In another possible implementation form of the NEHA according the second or fourth implementation form of the first aspect, the MNE 120 is indicated by a network identity, in particular an IP address plus a port number.

In another possible implementation form of the NEHA according the first aspect as such or any one of the preceding implementation forms of the first aspect, the first service and second service are web services.

In a second aspect, a system is provided. The system comprises a Network Entity running as a HTML5 Application, NEHA, the system further comprises a HTTP server, a network entity, NE, and a mirror network entity, MNE 120, wherein the MNE 120 is a mirror instance of the NE, a desired network protocol is run between the MNE 120 and the NE, the HTTP server is configured for receiving a first request requesting the MNE 120 from the NEHA, the first request comprising the desired network protoco, and configured for sending a first response indicating the MNE 120 to the NEHA; the NEHA is configured for communicating with the NE through the MNE 120; and the NNE 120 is configured for communicating with the NE using the desired network protocol.

In a first implementation form of the system according to the second aspect as such, when the NEHA is a client entity, the NE is a server entity, the NEHA (110) is configured for sending a second request for requesting a first service to the MNE (120), and for receiving a second response providing the first service from the MNE (120); the MNE 120 is configured for sending a fourth request to the NE (130) for requesting the first service upon the second request received from the NEHA; and for receiving a fourth response providing the first service from the NE, and for sending the second response to the NEHA (110) based on the fourth response.

In a second implementation form of the system according to the first implementation form of the second aspect, wherein the MNE 120 is further configured for caching the fourth response, when a latter another request requesting the first service and indicating the desired network protocol is received, the MNE 120 is configured for responding the latter another request directly based on the stored fourth response.

In a third implementation form of the system according to the second aspect as such, when the NEHA is a server entity, the NE is a client entity, the MNE 120 is configured for receiving a fifth request requesting a second service from the NE, for sending a third request for requesting the second service to the NEHA (110) based on the fifth request, and for sending a fifth response providing the second service to the NE based on a third response providing the second service received from the NEHA; the NEHA (110) is configured for receiving the third request from the MNE (120), and for sending the third response to the MNE (120) based on the third request.

In a fourth implementation form of the system according to the third implementation form of the second aspect, wherein the MNE 120 is further configured for caching the third response, when a latter another request requesting the second service, the MNE 120 is configured for responding the latter another request directly based on the stored third response.

In another possible implementation form of the system according the second aspect as such or any one of the preceding implementation forms of the second aspect, the MNE 120 is further configured for locally handling a part of the second requests from the NEHA and a part of the fifth requests from the NE.

The MNE 120 is enabled to act as the network entity to hand a part of the second requests, the network entity is discharged, and the network traffic is reduced, the bandwidth is saved accordingly. The MNE 120 is also enabled to act as the NEHA to hand a part of the fifth requests, the NEHA is discharged, and the network traffic is further reduced, the bandwidth is further saved.

In another possible implementation form of the system according the second aspect as such or any one of the preceding implementation forms of the second aspect, wherein the MNE 120 is further configured for communicating with the NEHA using the first network protocol, and for converting a message sent by the NEHA (110) from the first network protocol to the desired network protocol, and for converting a message to-be-sent to the NEHA (110) from the desired network protocol to the first network protocol, when the first network protocol and the desired network protocol are different.

In another possible implementation form of the system according the second aspect as such or any one of the preceding implementation forms of the second aspect, the HTTP server is further configured for determining the MNE 120 by using an existing mirror network entity or by setting up a new mirror network entity.

In another possible implementation form of the system according the second aspect as such or any one of the preceding implementation forms of the second aspect, the messages sent and received by the MNE 120, including the second request/response, the third request/response, the fourth request/response and the fifth request/response are the well known messages defined in the desired network protocol.

According to a third aspect, a method is provided. The method comprises creating and sending a first request to a HTTP server for requesting a mirror network entity MNE 120, wherein the MNE 120 is a mirror instance of a network entity NE, wherein the first request indicates a desired network protocol run between the NNE 120 and the NE; receiving and processing a first response indicating the MNE 120 from the HTTP server; and communicating with the NE through the MNE 120.

In possible first implementation form of the method according the third aspect as such, the method further comprise creating and sending a message to the MNE 120; and receiving and processing a message from the MNE 120.

In possible second implementation form of the method according the first implementation form of the third aspect, when the NEHA is a client entity for requesting a first service, the NE is a server entity providing the first service, wherein the message sent to the MNE 120 is a second request requesting the first service, the message received from the MNE 120 is a second response providing the first service.

In possible third implementation form of the method according the second implementation form of the third aspect, the desired network protocol comprises network protocols not supported by HTML5, in particular the Internet Group Management Protocol, IGMP, Internet Protocol Television, IPTV, group protocols, File Transfer Protocol, FTP, SSDP, SOAP and GENA.

The NEHA is enabled to flexibly choose from a lot of network protocols for initiating the service.

In possible fourth implementation form of the method according the first implementation form of the third aspect, when the NEHA is a server entity for providing a second service, the NE is a client entity requesting the second service, wherein the message received from the MNE 120 is a third request requesting the second service, the message sent to the MNE 120 is a third response providing the second service.

In possible fifth implementation form of the method according the fourth implementation form of the third aspect, the desired network protocol may comprise HTTP, auto discovery and control network protocol, and media auto discovery and control network protocol. The auto discovery and control network protocol comprises the UPnP group protocols, and Bonjour. The auto discovery & control (UPnP, Bonjour etc.) function is enabled in a HTML5 application by introducing the MNE 120.

In another possible implementation form of the method according the fourth implementation form of the third aspect, the media auto discovery and control network protocol comprises media UPnP group protocols, AirPlay and DLNA protocol. The UPnP media renderer and DLNA Media Player DMR function enabled in a HTML5 application by introducing the MNE 120. When the desired network protocol is the auto discovery and control network protocol, the NEHA is an auto discovery and control network device; when the desired network protocol is the media auto discovery and control network protocol, the NEHA is a media auto discovery and control network renderer device.

In sixth possible implementation form of the method according the third aspect as such or any one of the implementation forms of the third aspect, the method further comprises establishing a persistent connection between the NEHA and the MNE 120, accordingly the message sent to and received from the NNE 120 is transferred over the persistent connection.

In another possible implementation form of the method according the sixth implementation form of the third aspect, the persistent connection may be a WebSocket persistent connection, in particular a HTML5 WebSocket persistent connection or a secure link connection. The secure link connection may be an encrypted secure link connection. The WebSocket persistent connection may be a bi-direction WebSocket persistent connection. The persistent connection may provide scripting language interfaces, for instance, JavaScript interfaces.

By using a WebSocket connection as a persistent connection, communication between the NEHA and the NE can be implemented with any HTML5 application and any web service on any operating system (OS).

The sending the message to the MNE 120 may be performed via a web browser, in particular a HTML5 browser.

According to a fourth aspect, another method is provided to perform the steps according to the second aspect as such or any one of the implementation forms of the second aspect.

When the NEHA initiates a service request, no new applications have to be installed. The HTML5 application is available on each mobile device, no extra software has to be developed. The HTML5 browsers platform is thus allowed to run a variety of applications that were not possible until now.

The disclosure is based on the finding that a technique to expand the functionality of web browsers can be achieved by adding a mirrored service/device in the network, that can be launched dynamically, communicating with the user entity, e.g. an HTML5 application in the browser via a persistent connection, e.g. via HTML5 web socket (ws) or via HTML5 secure link web socket (wss encrypted for secure link). This solution avoids the need for any installation and works with any HTML5 browser and any web service on any operating system (OS). The disclosure thus provides techniques of enabling HTML5 applications in the browser or outside of the browser to run web server and web services in a secure and standard way by using a persistent connection, e.g. HTML5 web socket, and a mirrored service in the network. The technique allows the HTML5 application to dynamically load and initialize the mirror device with the appropriate service/protocol. Applying such techniques enables HTML5 browsers platform to run a variety of applications that were not possible until now.

Applying such techniques enables a HTML5 application to run web server and act as a web service server. A method applying such technique runs a not supported network protocol client in HTML5 in a HTML5 application. The technique is using a persistent connection such as a HTML5 web socket and a mirrored service/device instance in the network. HTML5 web socket provides JavaScript interface of a full-duplex persistent single socket direct communication. The mirrored services/devices may act as a proxy and transfer the required protocol to and from the web socket connection and let the JavaScript code inside the HTML5 application handle the request. The mirrored device may comprise a set of services that may be launched together for a specific HTML5 application to act as one device. The mirrored services/devices can handle some of the request without forwarding the request to the web socket tunnel by caching the response or having some of the service logic implemented in the mirrored service.

The methods, systems and devices described herein may be implemented as software in any CPU including a Digital Signal Processor (DSP), in a micro-controller or in any other side-processor or as hardware circuit within an application specific integrated circuit (ASIC).

The disclosure can be implemented in digital electronic circuitry, or in computer hardware, firmware, software, or in combinations thereof, e.g. in available hardware of conventional mobile devices or in new hardware dedicated for processing the methods described herein.

BRIEF DESCRIPTION OF THE DRAWINGS

Further embodiments of the disclosure will be described with respect to the following figures, in which.

DETAILED DESCRIPTION

Figure 1:
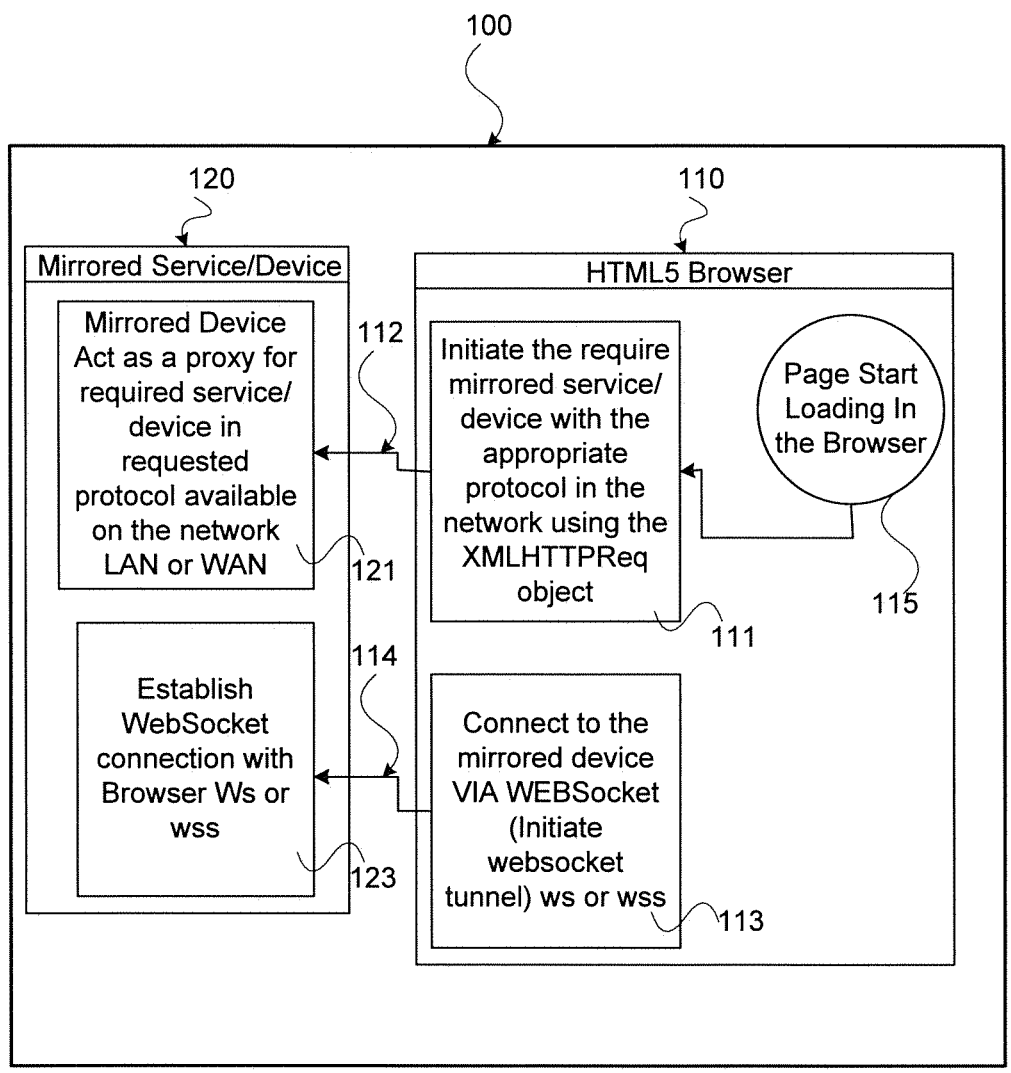
FIG. 1 shows a block diagram illustrating a system including a user entity and a network entity according to an implementation form.

In the following, web services are described. A web service is a method of communication between two electronic devices over the World Wide Web (WWW). The W3C defines a "web service" as "a software system designed to support interoperable machine-to-machine interaction over a network". It has an interface described in a machine-processable format (specifically Web Services Description Language, known by the acronym WSDL). Other systems interact with the web service in a manner prescribed by its description using SOAP messages, typically conveyed using HTTP with an XML serialization in conjunction with other Web-related standards. Web services have become a significant aspect of modern networking, used primarily as a means for businesses to communicate with each other and with clients, web services allow entities to exchange data without intimate knowledge of each other's IT systems behind the firewall. Unlike traditional client/server models, such as a Web server/Web page system, web services do not provide the user with a GUI. Web services instead share business logic, data and processes through a programmatic interface across a network. The applications interface, not the users. Developers can then add the web service to a GUI (such as a Web page or an executable program) to offer specific functionality to users. Most Web Services use HTTP for transmitting messages (such as the service request and response). Client initiates the request and receives a response from the server, until now HTML5 application could act only as Client using the XMLHttpReq object from javascript but could not act as a web service Server.

In the following, HTML 5 applications and web sockets are described. The HTML5 is an update and revision of HTML (Hyper Text Markup Language), which is the predominant markup language for Web pages. As such, HTML comprises the basic building-blocks of Web pages. While the HTML5 specification is still being developed at this time, some sections of it are already stable and there are implementations that are close to completion and can be used today, specifically of the web socket element. In particular, the latest versions of the most common Web browsers, such as Microsoft Internet Explorer, Mozilla Firefox™, Google Chrome and Apple Safari, implement the web socket element in accordance with the existing specification. A significant portion of the HTML5 is the specification of scripting application programming interfaces (APIs). These APIs are accessible from scripting languages that are executed by the browser, such as the JavaScript™ programming language. Additional programming languages executed by browsers that may be able to access the APIs include various variations of the ECMA Script standard such as Microsoft J Script and other scripting languages such as Microsoft VBScript™. In this document the term JavaScript will be used to represent all such languages as JavaScript is by far the most prevalent scripting language used in browsers, and is the term used in most standards documents.

The HTML5 becomes a standard de facto for Browser and Browsers are the base application in any OS (Windows, Android, IOS etc). HTML5 applications do not require installation and updates can be published instantaneously, they run inside the browser that provide an isolation layer and offer cross-device-compatibility. They can run online or offline and fully written in web languages such as Cascading Style Sheets (CSS), HTML, and Javascript. Their main limitation is that they cannot access native APIs of the operating system due to security reasons and for their role acting as an isolation layer for running arbitrary web pages code/application. More specifically, HTML5 application cannot open native networking API and all there network communication from the JavaScript is done only via the HTMLHttpReqobject which use HTTP only and the transaction can be initiated only from the browser, WebSocket and recently introduced webRTC. That said it is not possible for the HTML5 application to act as a non-supported by W3C (HTML5) network protocol client for example IGMP, UDP, TCP, RTSP. With the introduction of HTML5 web socket two way communications was made possible, for that reason Web-browsers today are, for the most part, client entities, there is no option of running a web server in a browser, more specifically there is no option to run an auto discovery & control (UPnP, Bonjour.) devices in a browser furthermore there is no option of running a DLNA DMR in a browser due to the requirement of an UPnP device to include http server, multicast sockets and more native OS API.

In the following, DLNA is described. DLNA is defining interoperability guidelines to enable sharing of digital media such as music, photos and videos between consumer devices such as computers, TVs, printers, cameras, cell phones, and other multimedia devices. DLNA is the main standard today for sharing digital media. DLNA uses Universal Plug and Play (UPnP) for media management, discovery and control. UPnP defines the type of device that DLNA supports ("server", "renderer", "controller") and the mechanisms for accessing media over a network. DLNA uses SOAP for control GENA for notification and SSDP for discovery. Digital Media Renders (DMR)—is a device which is defined in the DLNA and offers several web services for playback and rendering of digital content (implement the UPnP Media Renderer Template) until now it was impossible to implement DMR inside a browser. Digital Media Controllers (DMC)—Discovers content offered by DMS (s) and matches it to the abilities of DMR(s). DMCs are responsible for discovering devices and creating, controlling, and teardown of connections between DLNA devices.

Figure 11:
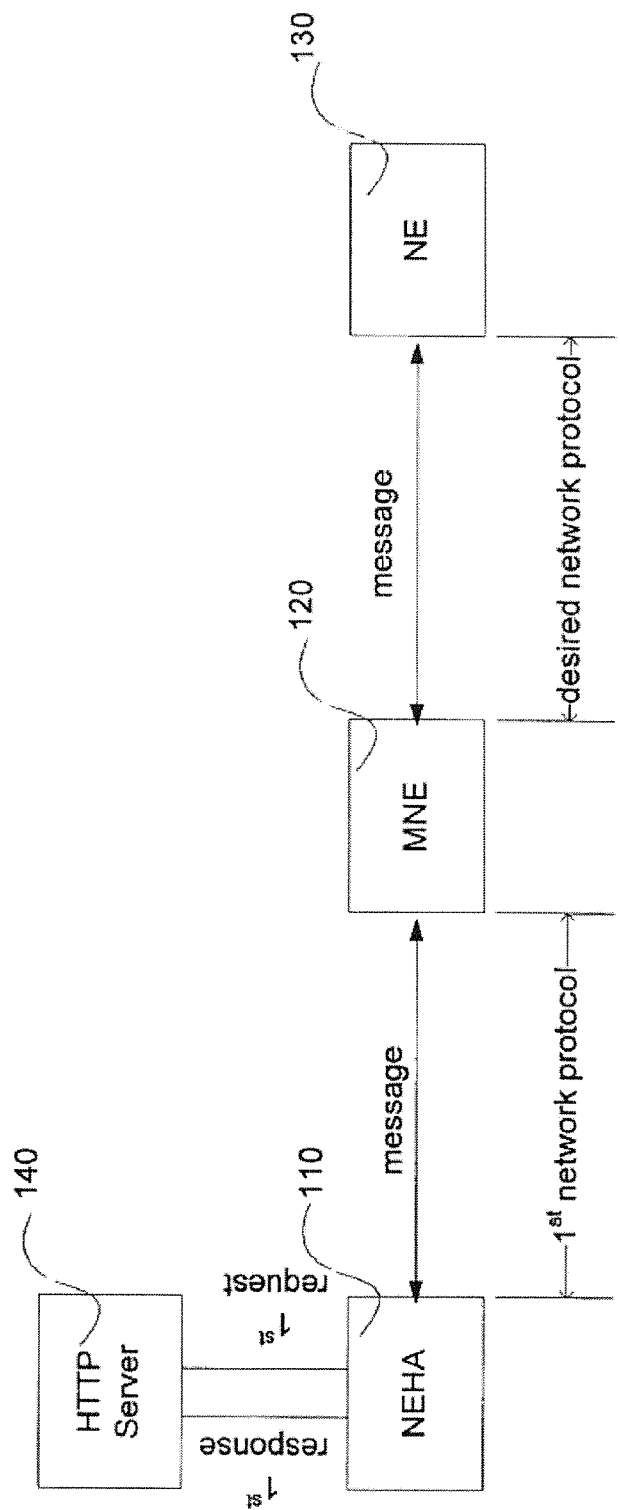
FIG. 11 illustrates a schematic diagram of a system according to an embodiment of the disclosure.
Figure 13:
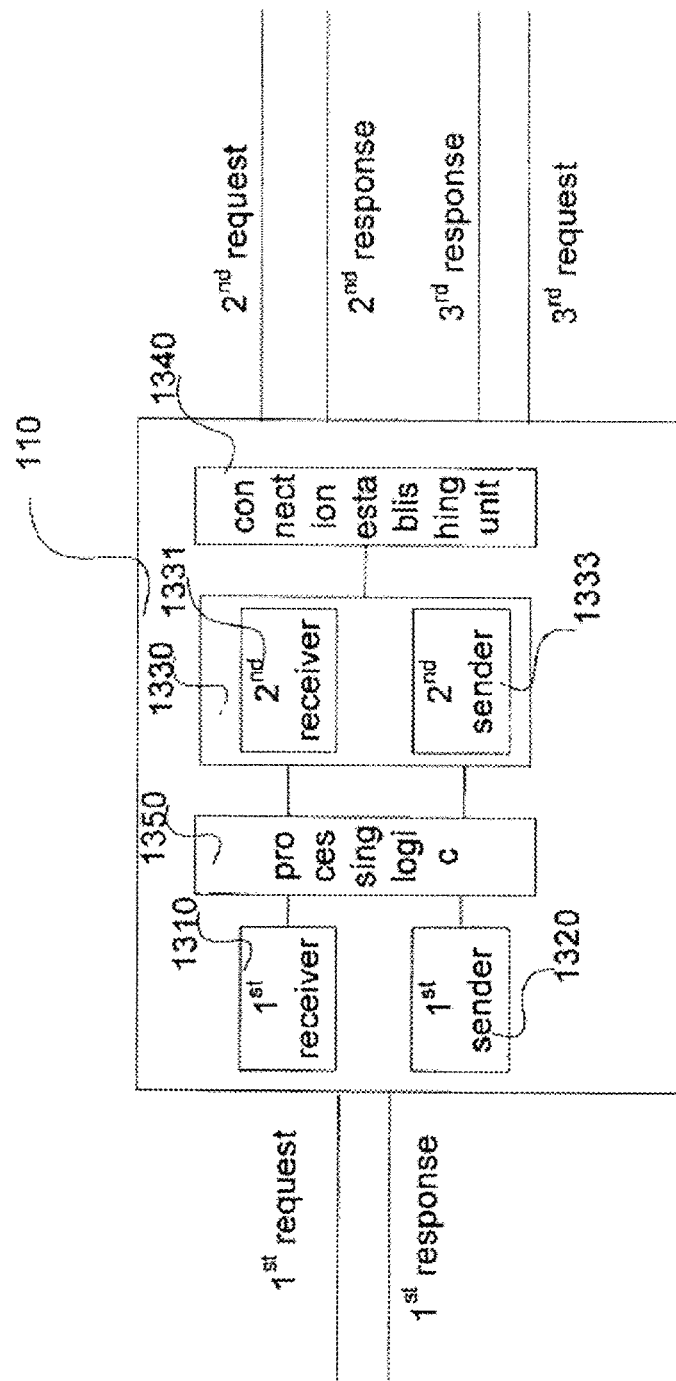
FIG. 13 illustrates a schematic diagram of a Network Entity running as a HTML5 Application (NEHA) according to an embodiment of the disclosure.

According to an embodiment of a Network Entity running as a HTML5 Application (NEHA) 110 as shown in FIG. 13, the NEHA 110 is provided in a system 1100 illustrated in FIG. 11 comprising a HTTP server 140, a network entity (NE) 130 and a mirror network entity (MNE) 120, wherein the MNE 120 is a mirror instance of the NE 130, a desired network protocol is run between the MNE 120 and the NE 130. The NEHA 110 of FIG. 11 corresponds to the NEHA 110 of FIG. 13. The NEHA 110 comprises: a first sender 1320 sends a first request to the HTTP server 140 for requesting the MNE 120, wherein the first request indicates the desired network protocol; a first receiver 1310 receives a first response indicating the MNE 120 from the HTTP server 140; a communicating unit 1330 communicates with the NE 130 through the MNE 120; and a processing logic 1350 creates the first request and processes the first response.

By communicating with the NE 130 through the MNE 120, the NEHA 110 is enabled to communicate with the NE 130 which runs a desired network protocol without the requirement of installing native applications or special plugins per browser and per operating system (OS) or per service type on the NEHA 110. The mirror network entity MNE 120 is also referred as mirrored device.

In a possible implementation form of the embodiment, the communicating unit 1330 comprises a second sender 1333 sends a message to the MNE 120; and a second receiver 1331 receives a message from the MNE 120. Accordingly the processing logic 1350 processes the message received from the MNE 120 and create the message to be sent to the MNE 120. The NEHA 110 can be a client entity requesting a web service or a server entity for providing a web service.

Figure 12:
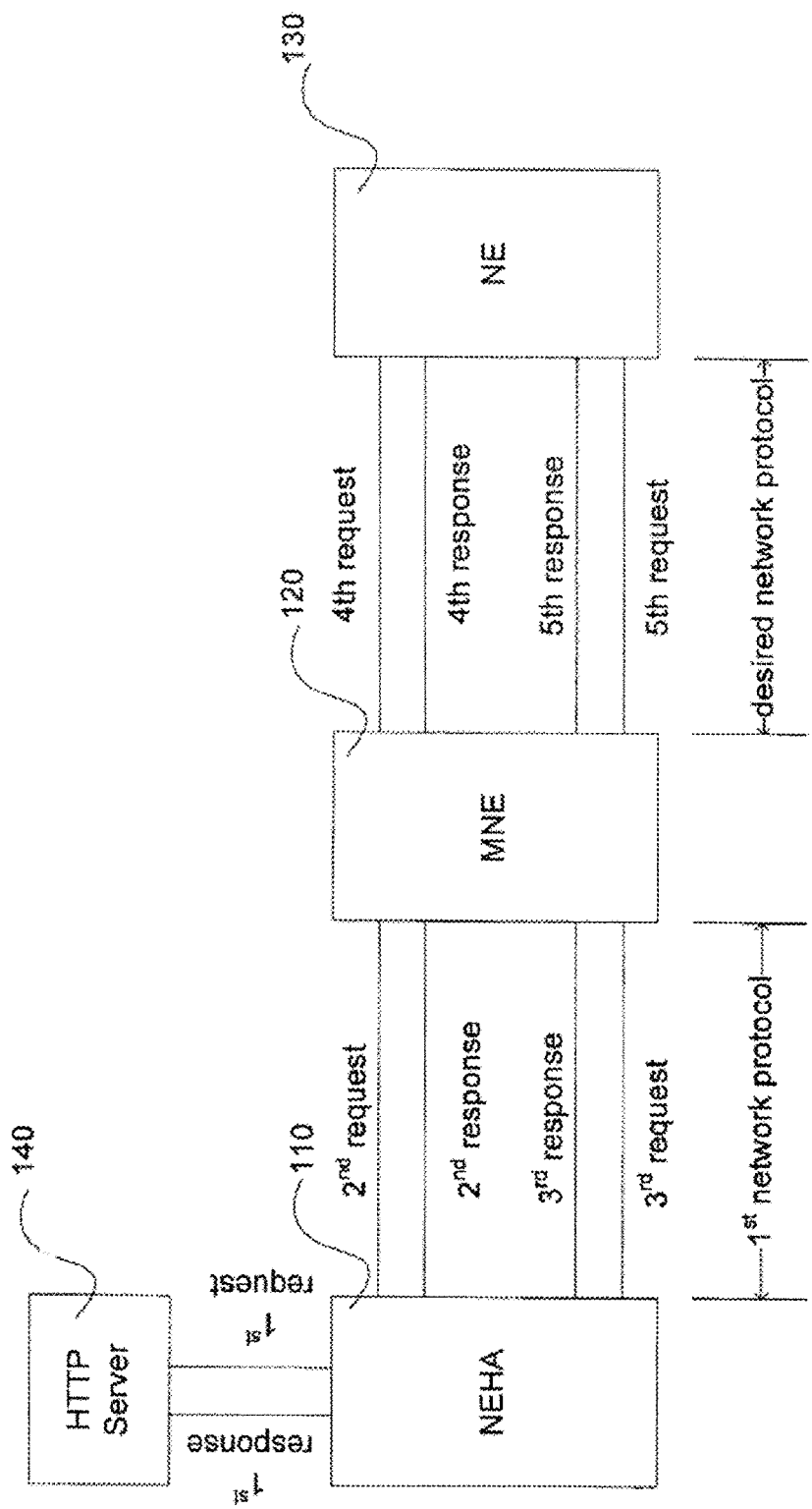
FIG. 12 illustrates a schematic diagram of a system according to another embodiment of the disclosure.

In a possible implementation form of the embodiment, when the NEHA 110 is a client entity for requesting a first service, the NE 130 is a server entity providing the first service, wherein the message sent to the MNE 120 is a second request requesting the first service, the message received from the MNE 120 is a second response providing the first service, shown in FIG. 12. The NEHA 110, MNE 120, NE 130 and HTTP server 140 of FIG. 12 correspond to the NEHA 110, MNE 120, NE 130 and HTTP server 140 of FIG. 11.

By doing this, the NEHA 110 is enabled to be a client entity for requesting a service and to act as a network client device for any network protocols that is not supported by the HTML5.

In a possible implementation form of the embodiment, the desired network protocol comprises network protocols not supported by HTML5, in particular the Internet Group Management Protocol, IGMP, Internet Protocol Television, IPTV, group protocols, and the File Transfer Protocol, FTP.

The NEHA 110 is enabled to run any network protocol client that is not supported by the HTML5 in a HTML5 application by introducing the MNE 120.

In a possible implementation form of the embodiment, when the NEHA 110 is a server entity for providing a second service, the NE 130 is a client entity requesting the second service, wherein the message received from the MNE 120 is a third request requesting the second service, the message sent to the MNE 120 is a third response providing the second service, shown in FIG. 12. The NEHA 110 is enabled to be a server entity for providing a service.

In a possible implementation form of the embodiment, the desired network protocol comprises HTTP, auto discovery and control network protocol, and media auto discovery and control network protocol.

In a possible implementation form of the embodiment, the auto discovery and control network protocol comprises the UPnP group protocols, and Bonjour. The auto discovery & control (UPnP, Bonjour etc.) function is enabled in a HTML5 application by introducing the MNE 120.

In a possible implementation form of the embodiment, the media auto discovery and control network protocol comprises media UPnP group protocols, AirPlay and DLNA protocol. The UPnP media renderer and DLNA Media Player DMR function enabled in a HTML5 application by introducing the MNE 120.

In a possible implementation form of the embodiment, when the desired network protocol is the auto discovery and control network protocol, the NEHA 110 is an auto discovery and control network device; when the desired network protocol is the media auto discovery and control network protocol, the NEHA 110 is a media auto discovery and control network renderer device.

In a possible implementation form of the embodiment, the NEHA 110 further comprises a connection establishing unit 1340 coupled to the communicating unit 1330 for establishing a persistent connection between the NEHA 110 and the MNE 120, accordingly the message sent to and received from the MNE 120 is transferred over the persistent connection.

In a possible implementation form of the embodiment, the persistent connection is a WebSocket persistent connection, in particular a HTML5 WebSocket persistent connection or a secure link connection. The secure link connection may be an encrypted secure link connection. The WebSocket persistent connection may be a bi-direction WebSocket persistent connection.

In a possible implementation form of the embodiment, the persistent connection provides scripting language interfaces, for instance, JavaScript interfaces.

In a possible implementation form of the embodiment, the NEHA 110 comprises a web browser 210 configured to communicating with the NE 130 through the MNE 120, such as sending the message to the MNE 120. The web browser is a HTML5 browser.

The web browser 210 comprises a HTML5 application configured to send the message to the MNE 120.

In a possible implementation form of the embodiment, a first network protocol is run between the NEHA 110 and the MNE 120.

In a possible implementation form of the embodiment, the first network protocol comprises the desired network protocol and a private protocol. When the second request and the second response are messages defined in the desired network protocol, taking the IGMP as an example, when the second request is the Join Group Request for a multicast group, the second response is the Join Group Reply; when the second request is the Leave Group Request, the second response is the Leave Group Reply. When the second request and the second response are messages of the private protocol, the Join Group Request could be in the form of "J<Address><Port>\n", the Leave Group Request could be in the form of "L<Address><Port>\n", a message for sending text could be in the form of "S<Address><Port><message>\n\n".

In a possible implementation form of the embodiment, a HTTP protocol is run between the NEHA 110 and the HTTP server 140, accordingly the first request and the first response are of the HTTP protocol.

In a possible implementation form of the embodiment, the MNE 120 is indicated by a network identity, in particular an IP address plus a port number.

In a possible implementation form of the embodiment, the first service and second service are web services.

As shown in FIG. 11 and FIG. 12, an embodiment of a system 1100/1200 is provided. The system comprises a Network Entity running as a HTML5 Application NEHA 110 of FIG. 13, the system 1100/1200 comprises a HTTP server 140, a network entity NE 130, and a mirror network entity MNE 120, wherein the MNE 120 is a mirror instance of the NE 130, a desired network protocol is run between the MNE 120 and the NE 130, the HTTP server 140 receives the first request requesting the FINE 120 from the NEHA 110, the first request comprising the desired network protocol used between the MNE 120 and the NE 130, and sends the first response indicating the MNE 120 to the NEHA 110; the NEHA 110 communicates with the NE 130 through the MNE 120; and the MNE 120 communicates with the NE 130 using the desired network protocol.

In a possible implementation form of the system embodiment, when the NEHA 110 is a client entity, the NE 130 is a server entity, the MNE 120 sends a fourth request requesting the first service upon the second request received from the NEHA 110; and for receiving a fourth response providing the first service from the NE, shown in FIG. 12. The NEHA 110, MNE 120, NE 130 and HTTP server 140 of FIG. 12 correspond to the NEHA 110, MNE 120, NE 130 and HTTP server 140 of FIG. 11.

In a possible implementation form of the system embodiment, wherein the MNE 120 caches the fourth response, when a latter second request requesting the first service and indicating the desired network protocol is received, the MNE 120 responds the latter second request directly based on the cached fourth response.

In a possible implementation form of the system embodiment, when the NEHA 110 is a server entity, the NE 130 is a client entity, the MNE 120 receives a fifth request requesting the second service from the NE 130, and for sending a fifth response providing the second service to the NE 130 based on the third service response received from the NEHA 110, shown in FIG. 12.

In a possible implementation form of the system embodiment, wherein the MNE 120 caches the third response, when a latter fifth request requesting the first service, the MNE 120 responds the latter fifth request directly based on the stored third response, shown in FIG. 12.

In a possible implementation form of the system embodiment, the MNE 120 locally handles a part of the second requests from the NEHA 110 and a part of the fifth requests from the NE 130.

The MNE 120 is enabled to act as the network entity to handle a part of the second requests, the network entity is discharged, and the network traffic is reduced, the bandwidth is saved accordingly. The MNE 120 is also enabled to act as the NEHA to hand a part of the fifth requests, the NEHA is discharged, and the network traffic is further reduced, the bandwidth is further saved.

In a possible implementation form of the system embodiment, wherein the MNE 120 communicates with the NEHA 110 using the first network protocol, and for converting the message from the first network protocol to/from the desired network protocol when the first network protocol and the desired network protocol are different.

In a possible implementation form of the system embodiment, the conversion is performed by a conversion unit of the mirror network entity. By having the conversion unit, the NEHA 110 is enabled to communication with the network entity not supporting the HTML5 application.

In a possible implementation form, the conversion is done by encapsulating the message of the private network protocol into the well known desired network protocol. such as encapsulating a header according to the desired network protocol, vice versa.

In a possible implementation form of the system embodiment, the HTTP server 140 determines the MNE 120 by using an existing mirror network entity or by setting up a new mirror network entity.

Figure 14:
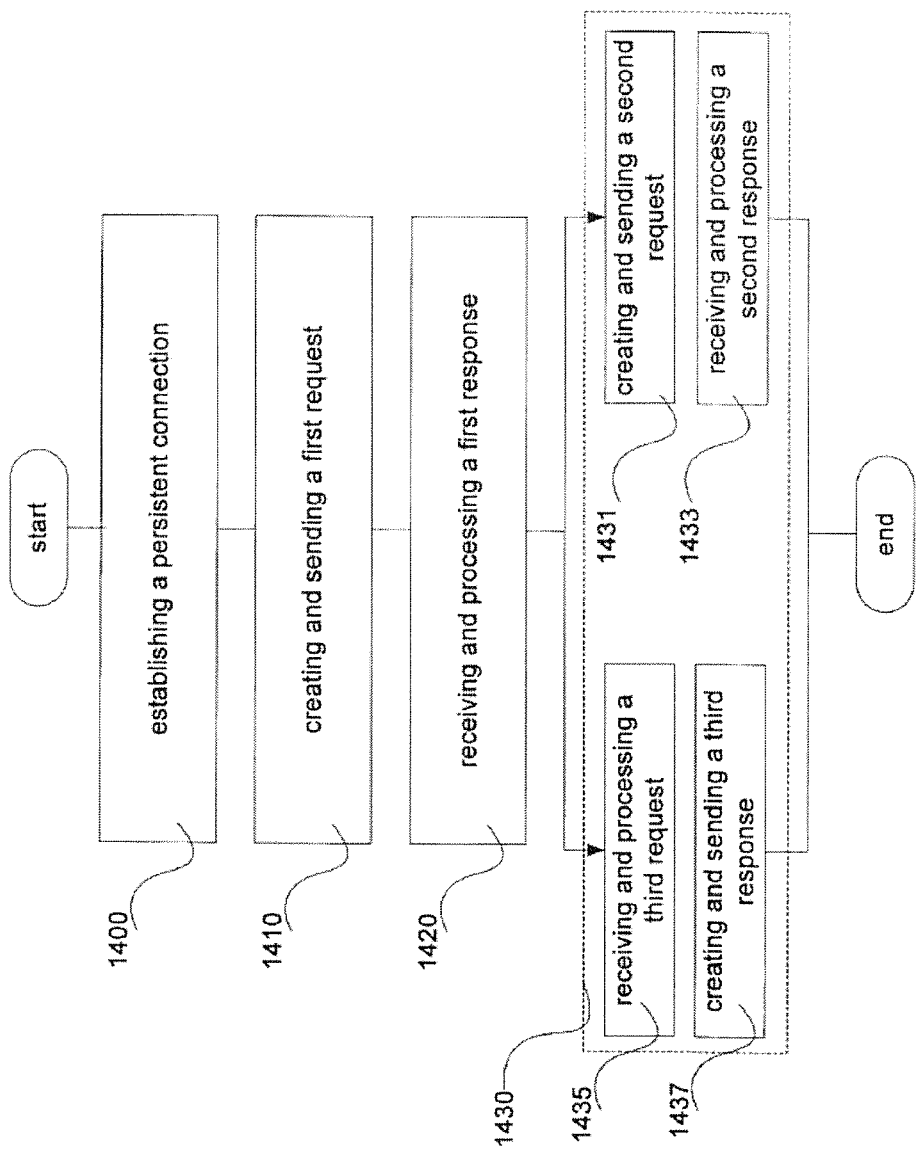
FIG. 14 illustrates a flow chart of a method according to another embodiment of the disclosure.

A method embodiment which is performed by the NEHA is illustrated in FIG. 14. The method may be performed by the NEHA 110 of FIG. 13. The method comprises:

Block 1410: creating and sending a first request to the HTTP server for requesting the MNE 120, wherein the first request indicates the desired network protocol;

Block 1420: receiving and processing a first response indicating the MNE 120 from the HTTP server; and Block 1430: communicating with the NE through the MNE 120.

In a possible implementation form of the method embodiment, the step of communicating 1430 comprises: sending a message to the MNE 120; and receiving a message from the MNE 120.

In a possible implementation form of the method embodiment, when the NEHA is a client entity for requesting a first service, the NE is a server entity providing the first service, wherein the message sent to the MNE 120 is a second request requesting the first service, the message received from the MNE 120 is a second response providing the first service. The step of communicating 1430 accordingly comprises:

Block 1431: creating and sending the second request requesting the first service; and Block 1433: receiving and processing the second response providing the first service. The desired network protocol comprises network protocols not supported by HTML5, in particular the Internet Group Management Protocol, IGMP, Internet Protocol Television, IPTV, group protocols, and the File Transfer Protocol, FTP.

In a possible implementation form of the method embodiment, a HTTP protocol is run between the NEHA and the HTTP server, accordingly the first request and the first response are of the HTTP protocol.

In a possible implementation form of the method embodiment, the MNE 120 is indicated by a network identity, in particular an IP address plus a port number.

In a possible implementation form of the method embodiment, when the NEHA is a server entity for providing a second service, the NE is a client entity requesting the second service, wherein the message received from the MNE 120 is a third request requesting the second service, the message sent to the MNE 120 is a third response providing the second service. The step of communicating 1430 accordingly comprises:

Block 1435: receiving and processing a third request requesting the second service; and Block 1437: creating and sending a third response providing the second service.

In a possible implementation form of the method embodiment, when the NEHA is a server entity for providing a second service, the NE is a client entity requesting the second service, the desired network protocol comprises HTTP, auto discovery and control network protocol, and media auto discovery and control network protocol.

The auto discovery and control network protocol comprises the UPnP group protocols, and Bonjour.

The media auto discovery and control network protocol comprises media UPnP group protocols, AirPlay, and DLNA protocol.

When the desired network protocol is the auto discovery and control network protocol, the NEHA is an auto discovery and control network device; when the desired network protocol is the media auto discovery and control network protocol, the NEHA is a media auto discovery and control network renderer device.

In a possible implementation form of the method embodiment, the method further comprises establishing 1400 a persistent connection between the NEHA and the MNE 120, accordingly the message sent to and received from the MNE 120 is transferred over the persistent connection.

According to a possible implementation form of the method embodiment, the persistent connection is a Web-Socket persistent connection, in particular a HTML5 Web- Socket persistent connection or a secure link connection. The secure link connection may be an encrypted secure link connection. The WebSocket persistent connection may be a bi-direction WebSocket persistent connection.

According to a possible implementation form of the method embodiment, the persistent connection provides scripting language interfaces, for instance, JavaScript interfaces.

In a possible implementation form of the method embodiment, the NEHA comprises a web browser configured to communicating with the NE through the MNE 120, such as using the web browser to send the message to the MNE 120.

The web browser comprises a HTML5 application configured to send the second request requesting the web service, or to send the third response.

In a possible implementation form of the method embodiment, a first network protocol is run between the NEHA and the MNE 120. The first network protocol comprises the desired network protocol and a private protocol.

Figure 15:
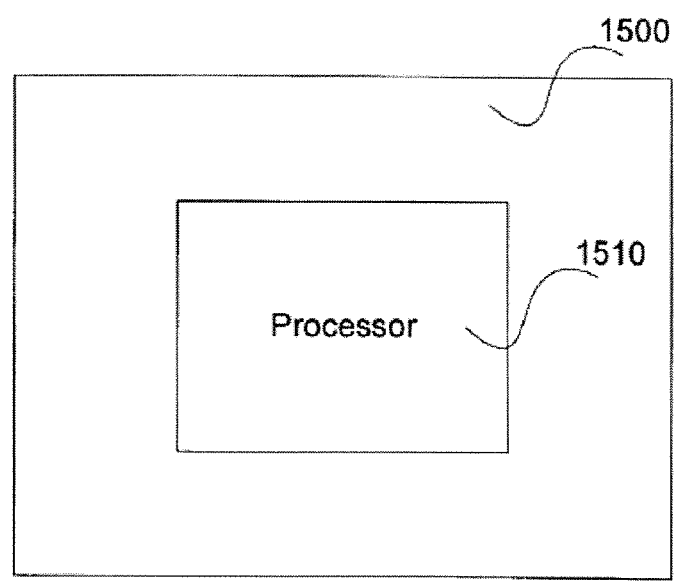
FIG. 15 illustrates a schematic diagram of a Network Entity running as a HTML5 Application (NEHA) according to another embodiment of the disclosure.

According to another NEHA embodiment as shown in FIG. 15, the NEHA 1500 comprises a processor 1510 to perform the method embodiment according to FIG. 14.

FIG. 1 shows a block diagram illustrating a system 100 including a NEHA indicated as a user entity 110 and a MNE 120 referred as a mirrored service instance according to an implementation form. The user entity 110 requests 112 a web service from a MNE 120 according to the desired network protocol. The user entity 110 is configured to establish 114 a persistent connection to the MNE 120. The user entity 110 includes a first block 115 "Page Start loading in the browser" for triggering operation of a second block 111 "Initiating the required mirrored service/device with the appropriate protocol in the network using the XMLHTTPReq object". The second block 111 represents the requesting of the web service with the desired network protocol. For the request, HTML language may be used, such as the XMLHTTPReq object for posting the request. The MNE 120 includes a first block 121 "Mirrored device act as a proxy for required service/device in requested protocol available on the network LAN or WAN" which bringing-up block 121 is configured to bring-up a MNE 120 according to the desired network protocol. The MNE 120 includes a connection enable block 123 "Establish web socket connection with web browser ws or wss" which second block 123 is configured to establish 114 a persistent connection between the user entity 110 and the MNE 120. The user entity 110 includes a third block 113 "Connect to the mirrored device via web socket (initiate the web socket tunnel via ws or wss)".

In an implementation form, the persistent connection includes a web socket connection abbreviated by "ws", in particular a HTML5 web socket connection. In an implementation form, the persistent connection includes a web socket secure abbreviated by "wss", in particular an encrypted secure link connection. In an implementation form, the user entity 110 includes a web browser configured to initiate the request for the web service. In an implementation form, the web browser includes a HTML5 application configured to initiate the request for the web service. In an implementation form, the MNE 120 is configured to act as a proxy connecting the user entity 110 to the web service server through the persistent connection. In an implementation form, the MNE 120 is configured to handle at least part of the request of the client entity. In an implementation form, the mirrored instance of the web service includes a set of web services launched by the MNE 120 according to the desired network protocol. In an implementation form, the user entity 110 is configured to establish the persistent connection providing scripting language interfaces, in particular JavaScript interfaces. In an implementation form, the network entity 120 is configured to enable running an auto discovery and control device, in particular one of the following: HTML5, UPnP, Bonjour in a HTML5 application of the user entity as described below. In an implementation form, the network entity 120 is configured to enable running a media renderer device, in particular one of a UPnP media renderer device and a DLNA digital media renderer device in a HTML5 application of the user entity as described below. In an implementation form, the network entity 120 is configured to enable running a video client device, in particular one of an IPTV device and an IGMP device in a HTML5 application of the user entity as described below. In an implementation form, the desired network protocol includes one of the following network protocols: HTTP, non-HTTP, SSDP, SOAP, GENA and IGMP as described below.

FIG. 1 illustrates how a generic HTML5 application can initialize the mirrored service instance in the network via the network as described in the following. The MNE 120 can be launched dynamically on the network entity via the JavaScript using the XMLHttpReq object as shown in FIG. 1. The page starts loading 115 the JavaScript to initiate a connection 111 to the network server, e.g. a network server in the network entity 120, and launches the mirrored service on the network server, the said JavaScript then connects 113 to the web socket server, e.g. via one of the two URI schemes, ws: and wss: for unencrypted and encrypted connections respectively. In that stage a persistent bi-directional connection between the HTML5 application of the user entity and the network device in the network is established.

FIG. 1 also describes a method and apparatus for enabling a HTML5 application to run web server and act as web service server. Additionally, FIG. 1 describes a method using the same system and technique to run a non-supported by W3C (HTML5) network protocol client in a HTML5 application. The technique is using the HTML5 web socket and a mirrored service instance in the network.

HTML5 web socket provides a JavaScript Interface of a full-duplex persistent single socket direct communication. The mirrored service(s) in its basic embodiment act as a proxy and transfer the required protocol to and from the web socket connection and let the JavaScript code inside the HTML5 application handle the request. The mirrored device basic embodiment is a set of services that are being launched together for a specific HTML5 application to act as one device. The mirrored service in an advanced implementation handles some of the request without forwarding the request to the web socket tunnel by caching the response or having some of the service logic implemented in the mirrored service.

Figure 2:
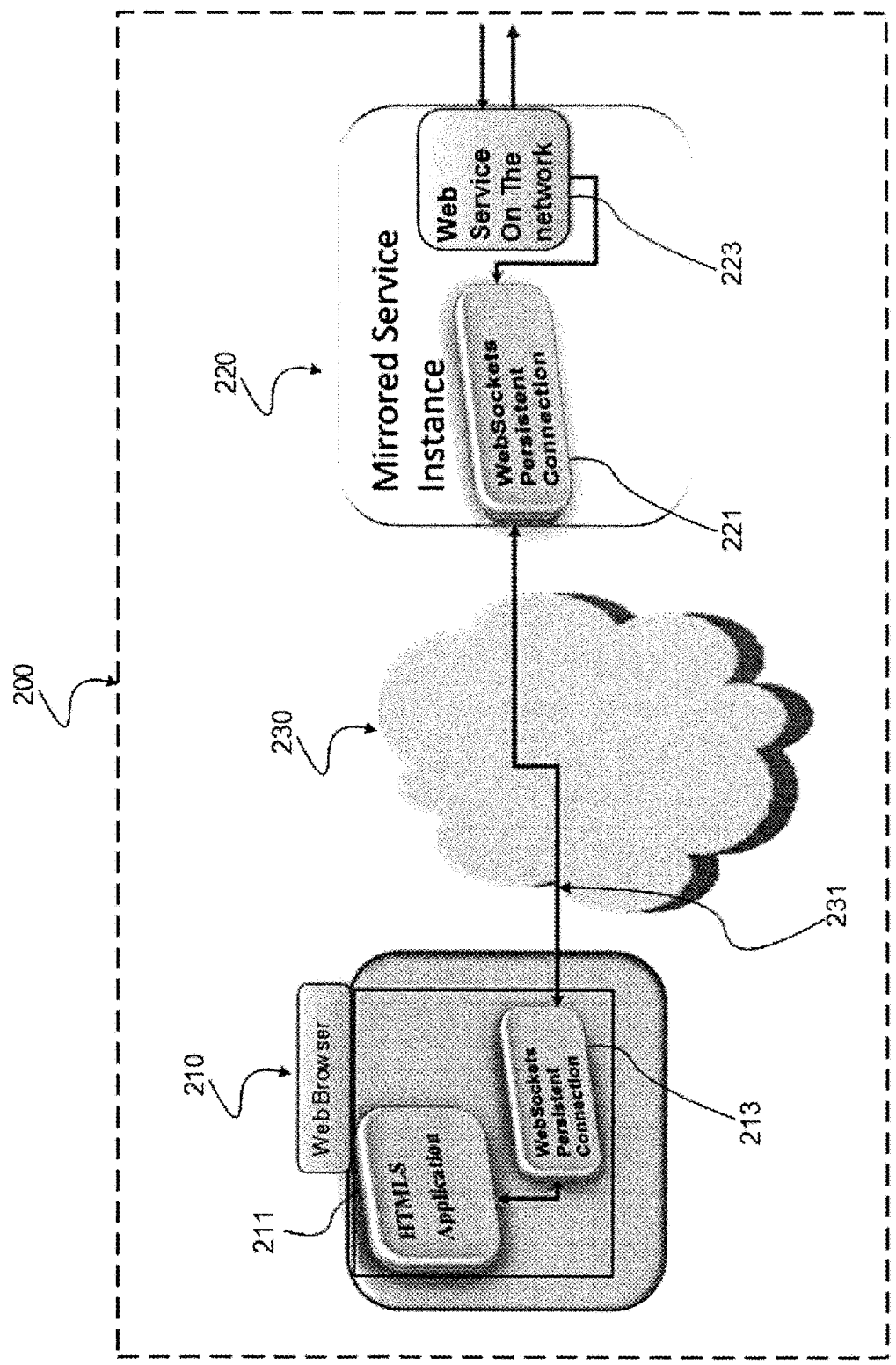
FIG. 2 shows a block diagram illustrating a generic network system according to an implementation form.

FIG. 2 shows a block diagram illustrating a generic network system 200 according to an implementation form. The system 200 comprises a NEHA indicated as a user entity 210 and a NNE 120 220 provides a mirrored service instance. The figure shows a web service 223 available in the network that acts as a proxy and lets the HTML5 application 211 handle the request. A web browser 210, e.g. running on a user entity 110 as described above with respect to FIG. 1 includes a HTML5 application 211 and a block "web socket persistent connection" 213 configured to initiate a persistent connection to a web server or web service available in the network. The persistent connection may be a web socket persistent connection 231 through a network 230. A mirrored service instance 220, e.g. a mirror network entity 120 as described above with respect to FIG. 1, includes a block "web socket persistent connection" 221 configured to establish the persistent connection to the web server. The mirrored service instance 220 includes a further block "web service on the network" 223 which forms the mirrored web service of the network that is available for connection at the mirrored service instance 220.

Figure 3:
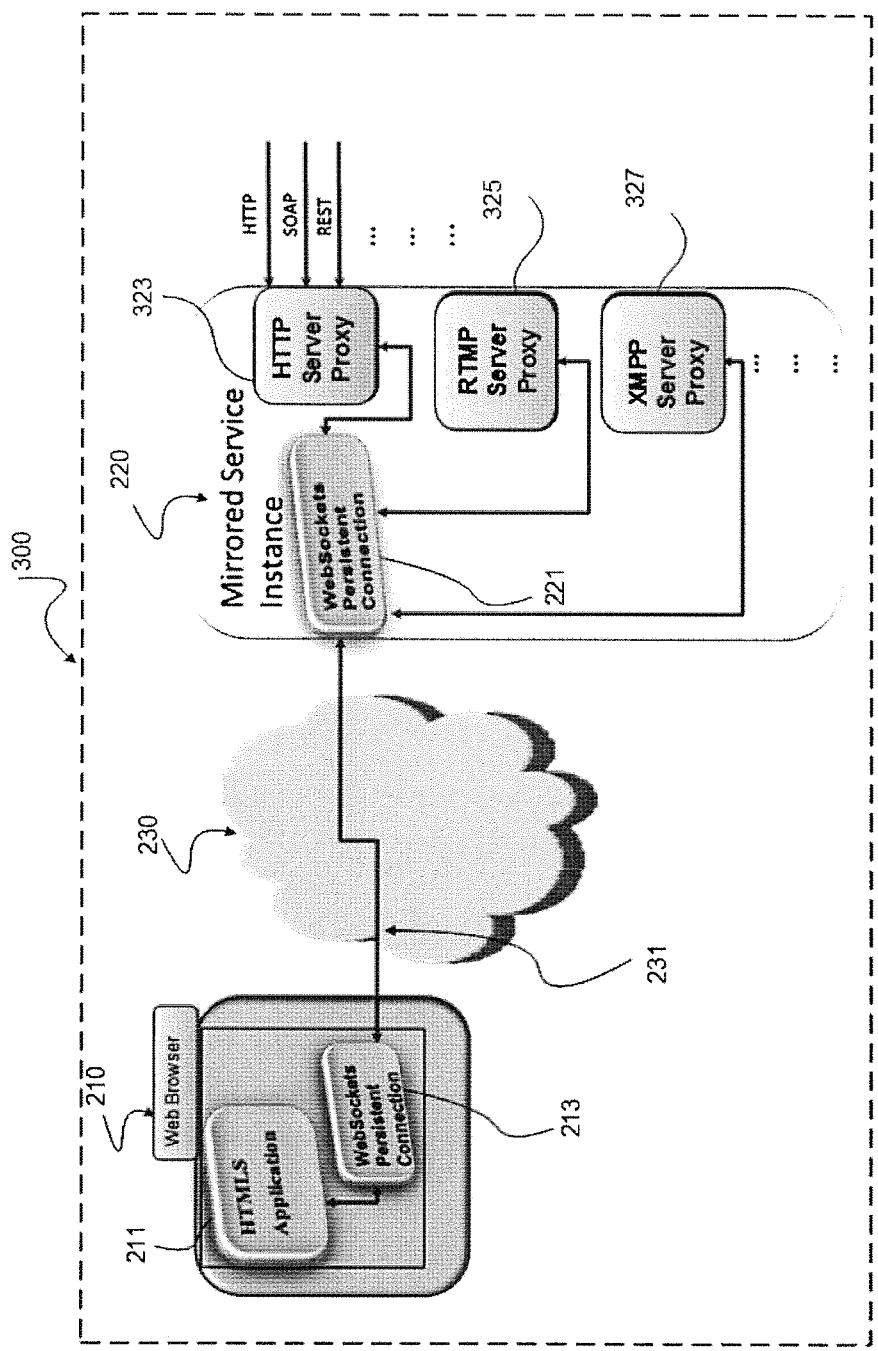
FIG. 3 shows a block diagram illustrating a generic network system with exemplary services, in accordance with an implementation form.

FIG. 3 shows a block diagram illustrating a generic network system 300 with exemplary services, in accordance with an implementation form. The system 300 comprises a NEHA indicated as a user entity 210 and a MNE 120 220 provides a mirrored service instance. The generic network system 300 may correspond to the generic network system 200 described above with respect to FIG. 2. In one example, the MNE 120 220 acts as a proxy and lets the HTML5 application 211 handle the request, is implemented as a HTTP server proxy 323. In one example, the MNE 120 220 acts as a proxy and lets the HTML5 application 211 handle the request, is implemented as a RTMP server proxy 325. In one example, the MNE 120 220 acts as a proxy and lets the HTML5 application 211 handle the request, is implemented as an XMPP server proxy 327.

In one example, an HTTP server and server proxy are used for SOAP or for REST or for any other CGI interface available on top of the HTTP protocol. The HTTP server proxy 323 extracts the request parameters and transfers them into the web socket tunnel for the JavaScript to handle. The response is returned via the Web Socket tunnel and then converted into the required protocol on top of HTTP e.g. SOAP REST etc. In another example, an RTMP server proxy 325 is used as mirrored service instance. The RTMP server proxy 325 proxies the RTMP request into the tunnel and vice versa. In another example not depicted in FIG. 3, an RTSP server proxy is used as mirrored service instance. The RTSP server proxies the RTSP request into the tunnel and vice versa. In another example, a real time messaging protocol XMPP server proxy 327 is used as mirrored service instance. The XMPP service proxy enables the HTML5 application to work as a client or server for the XMPP protocol. This applies to any other network service server or client that required network OS API not available in HTML5.

Figure 4:
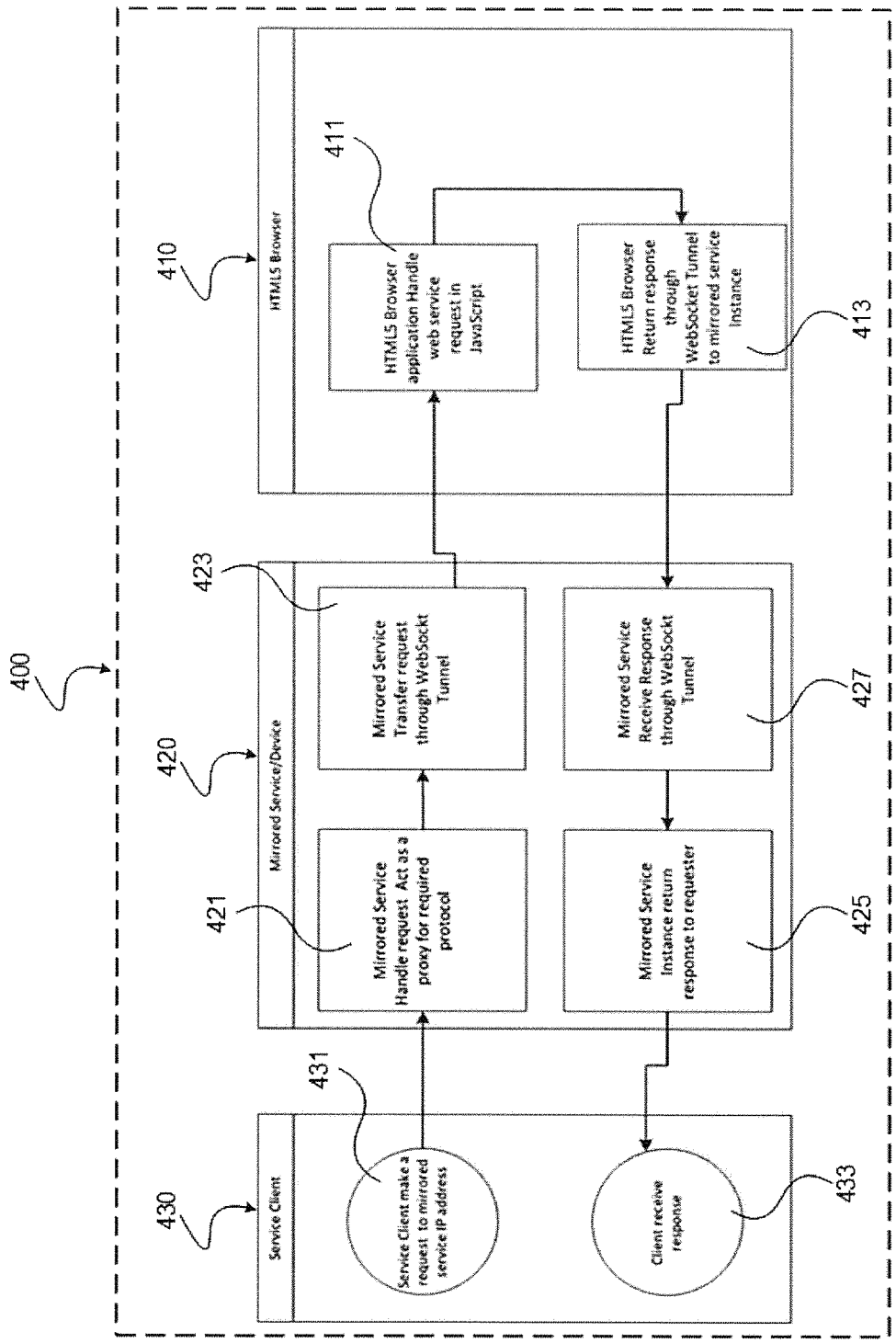
FIG. 4 illustrates a flow diagram of a HTML5 and Mirrored service/device communication when HTML5 application acts as a server entity, in accordance with an implementation form.

FIG. 4 illustrates a flow diagram in a communication system 400 between a NEHA acting as a server entity indicated as a HTML browser 410 and MNE 120 indicated as a mirrored service/device 420, in accordance with an implementation form. FIG. 4 illustrates the flow when a web service client 430 (also called client entity) initiates a call to the mirrored service 420 in the network in a web protocol. The mirrored service 420 converts the call if needed and proxies and/or transfers the request to the HTML5 application 410 via the WebSocket tunnel established in the initiation phase. The HTML5 application 410 handles the request, generates a response and transfers the response back via the WebSocket connected to the mirrored service 420. The mirrored service 420 converts the response into said protocol if needed and sends the response back to the web service client 430 in said protocol.

The following blocks are processed by the system 400. The service client 430 makes a request to MNE 120 indicated by a mirrored service IP address 431. The mirrored service 420 handles the request and acts as a proxy for the required protocol 421. The mirrored service 420 transfers the request through a web socket tunnel 423 to the HTML5 browser 410. The HTML5 browser application handles the web service request in JavaScript language 411. The HTML5 browser 410 returns a response 427 through the web socket tunnel to the mirrored service/device 420. The mirrored service 420 returns the response to the requester 425, i.e. to the service client 430. The service client 430 receives the response 433. The HTML5 browser 410 may run on a user entity 110, 210 as described above with respect to FIGS. 1 to 3. The mirrored service 420 may run on a MNE 120, 220 as described above with respect to FIGS. 1 to 3.

Figure 5:
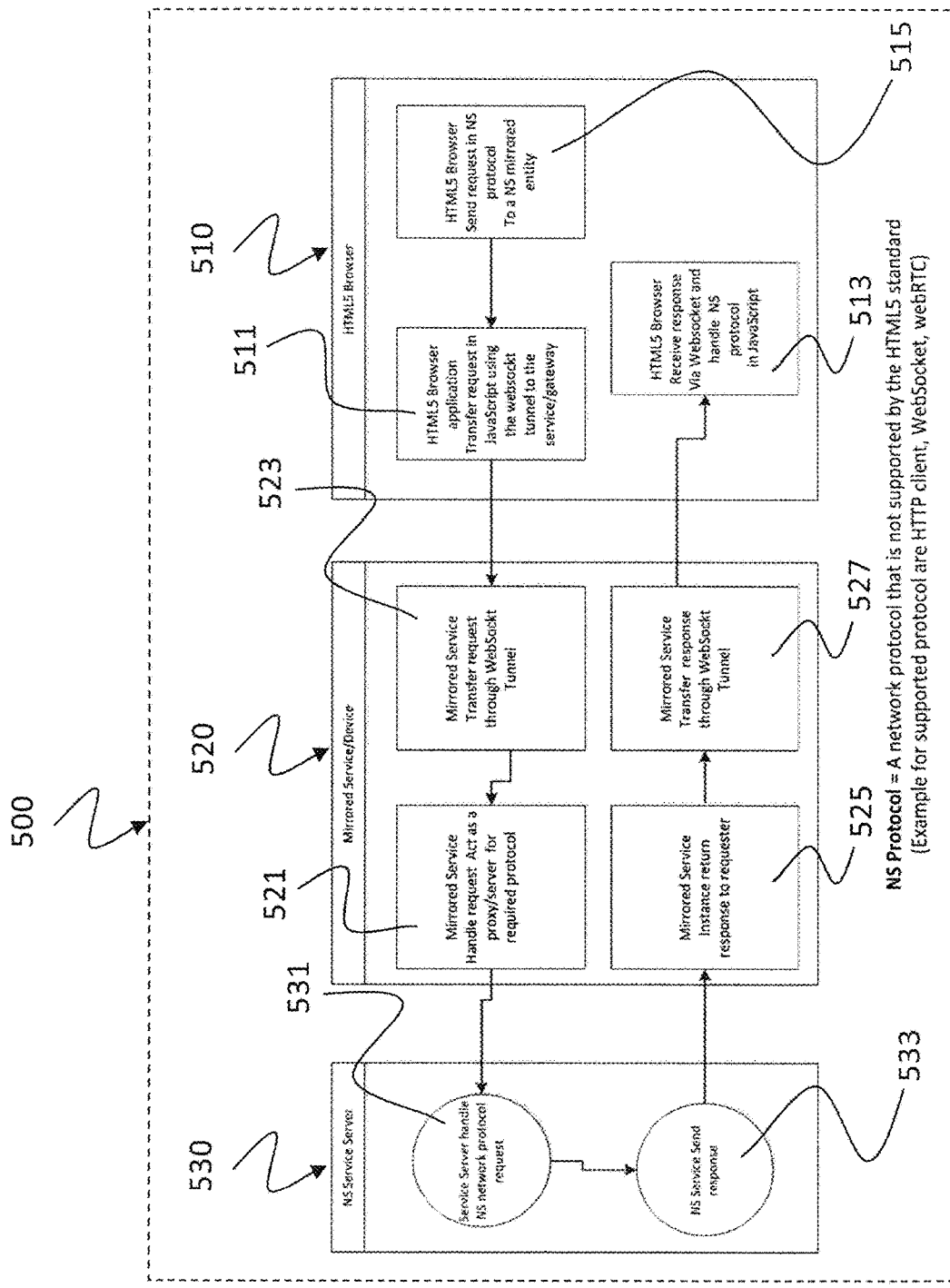
FIG. 5 illustrates a flow diagram of a HTML5 and Mirrored service/device communication when HTML5 application acts as a client entity for a non-supported network protocol in the HTML5, in accordance with an implementation form.

FIG. 5 illustrates a flow diagram in a communication system 500 between a NEHA acting as a client entity for a non HTTP protocol, a MNE 120 and network entity acting as a non-standard HTML5 network protocol (NS) server. The NEHA, the NNE 120 and the NE are shown as a HTML5 browser 510, a mirrored service/device 520 and a NS service server 530, respectively, in accordance with an implementation form. The client entity for the request may be implemented in JavaScript in the HTML5 application and may initiate from the HTML5 application the transfer to the mirrored service/device 520 by using the web socket tunnel established in the initiation phase. The mirrored service/device 520 then proxies the request, converts it if needed and transfers the request to the non-standard HTML5 network protocol (NS) server 530. The response from the NS server protocol 530 is received by the mirrored service/device 520 that then converts it if needed and transfers the response back to the HTML5 application 510 via the web socket tunnel.

The following blocks are processed by the system 500. The HTML5 browser 510 sends a request 515 in a NS network protocol to a NS server entity 530. The HTML5 browser 510 application transfer the request 511 in JavaScript language using the web socket tunnel to the mirrored service/device 520. The mirrored device 520 transfers the request 523 through the web socket tunnel. The mirrored device 520 handles the request 521 acting as a proxy or server for the required protocol. The service server 530 handles the NS network protocol request 531 and sends a response 533. The mirrored device 520 returns the response to the requester, i.e. the HTML5 browser 510. The mirrored device 520 transfers the response 527 through the web socket tunnel. The HTML5 browser 510 receives the response 513 via the web socket and handles the NS network protocol in JavaScript language.

The HTML5 browser 510 may run on a user entity 110, 210 as described above with respect to FIGS. 1 to 3. The mirrored service 520 may run on a network entity 120, 220 as described above with respect to FIGS. 1 to 3. The NS network protocol server 530 may run on a service client 430 as described above with respect to FIG. 4, e.g. together with a HTTP protocol server.

Figure 6:
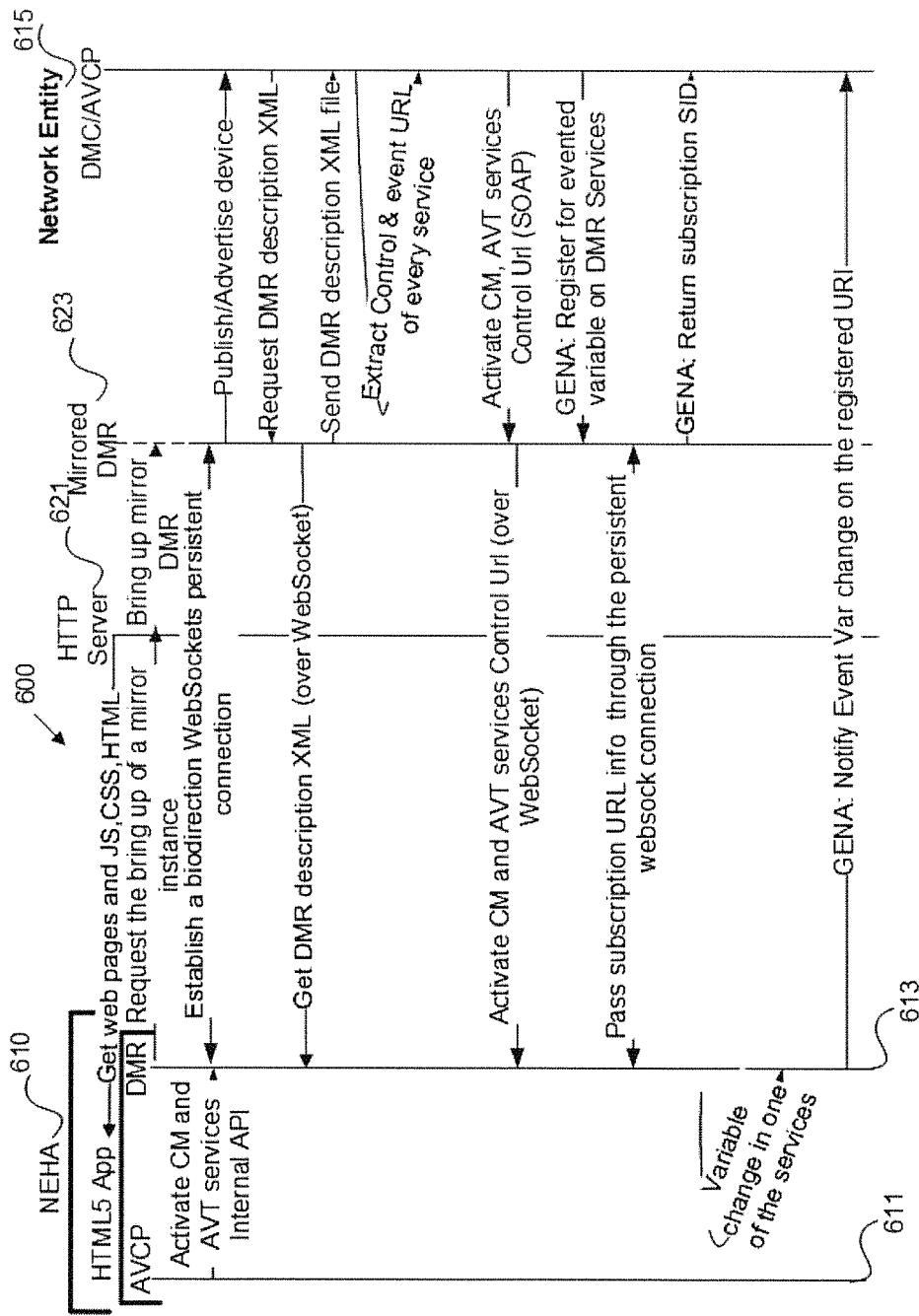
FIG. 6 illustrates a flow diagram of an exemplary implementation of a DLNA DMR device inside the browser using the SSDP, GENA, SOAP service mirroring bundle, in accordance with an implementation form.

FIG. 6 illustrates a flow diagram 600 of an exemplary implementation of the system. The system comprises a NEHA 610, a HTTP server 621, a mirrored DMR 623 acting as the MNE 120, and a NE 615. The NEHA 610 acts as a server entity, the NE 615 acts as a client entity. The NEHA comprises a HTML5 browser. The HTML5 browser comprises an AVCP 611 and a DMR 613. The DLNA DMR 613 inside the browser 610 using the SSDP, GENA, SOAP service mirroring bundle, in accordance with an implementation form. DLNA DMR 613 is implementing the UPnP media renderer template and as such needs to implement SOAP for control, SSDP for discovery, GENA for the event mechanisms and XML over HTTP for the addressing.

FIG. 6 shows in the flow diagram 600 how the mirrored DMR device 623 is instantiated and all the flow of operation from the discovery to the addressing and to the control and later the events. The browser 610 includes an audio video control point (AVCP) 611 and a DRM 613. A DMC/AVCP 615 is implemented outside the browser 610. A HTTP server 640 and a mirrored DMR 630 are installed on the server 620.

According to FIG. 6, the following flow sequence or parts of that flow sequence may be implemented. The HTTP server 621 sends a message to the HTML5 application inside the browser of the NEHA 610 to get web pages and JSS, CSS, HTML. The DMR 613 sends a message to the HTTP SERVER 621 to request the bring-up of a mirror instance which message is forwarded by the HTTP server 621 to the mirrored DMR 623. A two way web sockets persistent connection is established between the DMR 613 and the mirrored DMR 623. The mirrored DMR 623 sends a message to the DMC 615 to publish/advertise the new device. The DMC 615 requests the DMR description XML file for that new device. The mirrored DMR 623 sends a message (over web socket) to the DMR 613 to get DMR description XML. The mirrored DMR 623 sends the DMR description file to the DMC 615 which extracts control and event URL of every service. The DMC 615 sends a message to the mirrored DMR 623 to activate connection manager (CM) and audio and video transport (AVT) services control URL (SOAP). The mirrored DMR 623 sends a message to the DMR 613 to activate CM and AVT services control URL (over web socket). The DMC 615 sends a GENA message to the mirrored DMR 623 to register for evented variable on DMR services. The mirrored DMR 623 sends a message to the DMR 613 to pass subscription URL info through the persistent web socket connection. The mirrored DMR 623 sends a GENA message to the DMC 615 to return subscription SID. If a variable change occurs in one of the services of the DMR 623, the DMR 623 notifies the DMC 615 by a GENA notify event message that a variable has changed on the registered URI.

Figure 7:
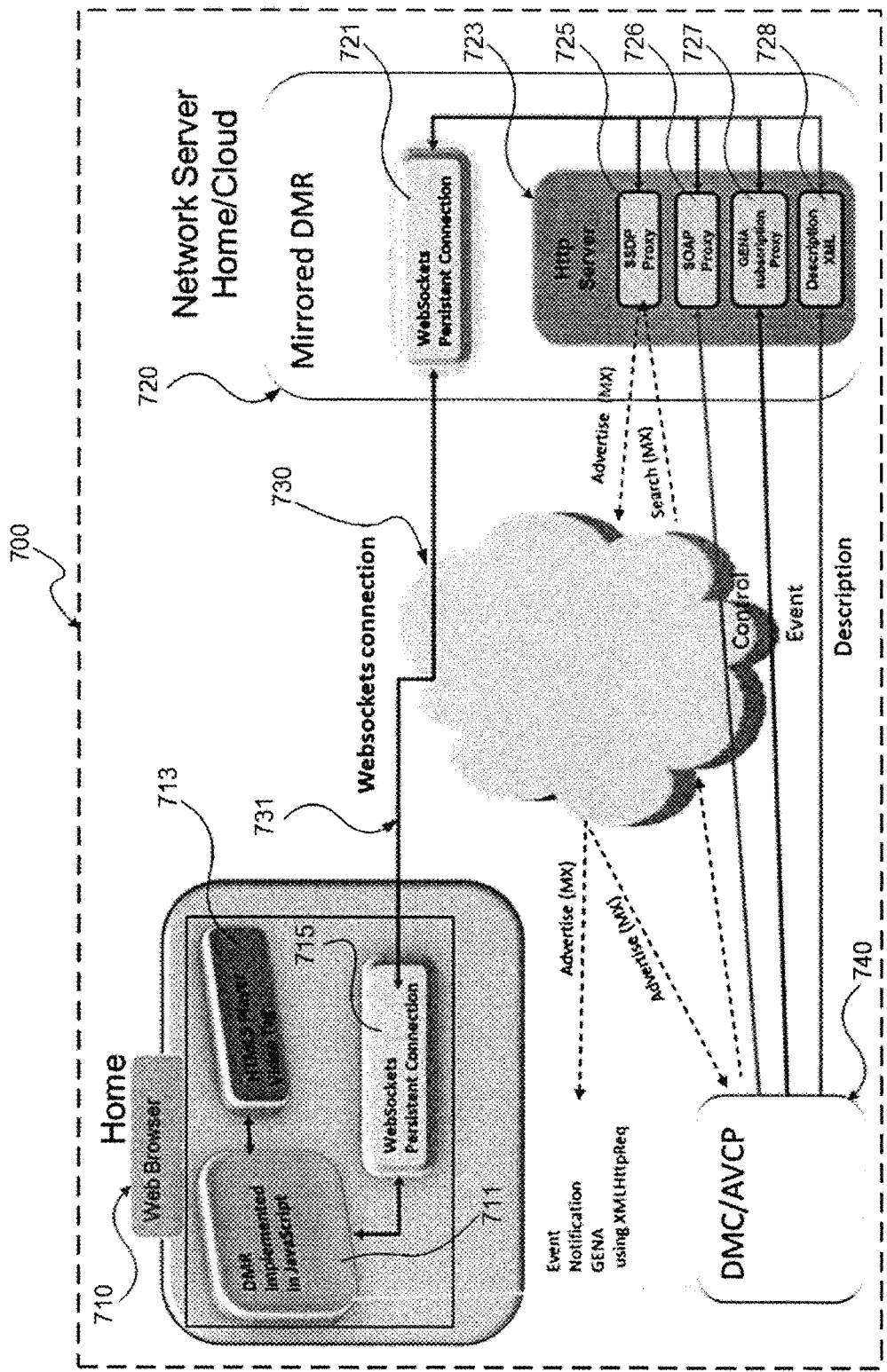
FIG. 7 illustrates a block diagram of an exemplary implementation of a DLNA DMR inside the browser using the SSDP, GENA, SOAP service mirroring in accordance with an implementation form.

FIG. 7 illustrates a block diagram of an exemplary implementation of a system 700 with a DLNA DMR 711 inside the browser 710 using the SSDP, GENA, SOAP service mirroring, in accordance with an implementation form. The system 700 may implement the flow diagram 600 as described above with respect to FIG. 6. The system 700 comprises a NEHA 710, a mirrored DMR 720 acting as the MNE 120 arranged in a network server or a home cloud, and a DMC/AVCP 740 acts as a NE. The NEHA 710 acts as a server entity, the NE 740 acts as a client entity. The NEHA comprises a web browser. The web browser of the NEHA 710 includes an HTML5 application 711, e.g. a HTML5 player video tag, a DMR 713 implemented in JavaScript and a web socket persistent connection 715. The mirrored DMR 720 includes a web socket persistent connection 721 connected through a network 730 to the web socket persistent connection 715 of the web browser 710. The mirrored DMR 720 includes a http server 723 including an SSDP proxy 725, an SOAP proxy 726, a GENA subscription proxy 727 and a description XML 728. The DMC 730 may send control, event and description messages to the mirrored DMR 720.

The discovery service for an UPnP device may be SSDP. A SSDP device sends a periodic notify message over a specified multicast address and answers to search requests sent over the same multicast address.

FIG. 7 shows that the SSDP mirrored service in the network sends and receives the multicast messages and transfers them in unicast. Through the web socket tunnel 731, the MNE 120 720 transfers search requests to the HTML5 application 713 to handle or have some logic layer in the service that responds the notify message back to the requester. Notify messages sent from the HTML5 application 713 are periodically transferred through the web socket tunnel 731 and then sent on the SSDP multicast address to the network. The addressing service for the UPnP device may be xml over HTTP. The basic implementation is shown where all the communication is tunneled through the web socket 731 to the HTML5 JavaScript 711. In an advanced implementation not shown in FIG. 7, the addressing service caches the XML description documents or receives them once from the HTML5 application 713. The control service for UPnP devices may be SOAP. SOAP is basically RPC using xml over http with additional HTTP headers. The SOAP mirrored service instance proxy 726 receives the SOAP request, gathers all relevant information needed and transfers it through the web socket tunnel to the HTML5 application 713 to handle and perform the action. Then, it returns the resource according to the required response for the UPnP action through the web socket tunnel 731 for the SOAP mirrored service instance proxy 726 to convert it into SOAP response including the relevant HTTP headers. The event mechanism in UPnP may be GENA for that in the mirrored DMR 720 in the network a mirrored GENA proxy 727 is available. The mirrored GENA proxy 727 handles GENA subscription request that receives a URI of the subscriber to notify him on event change. The request is transferred to the HTML5 application 713 via the web socket tunnel 731. The HTML5 application 713 adds the URI to the service subscription list and returns a subscription ID SID and subscription timeout (subscription ID to the subscriber Control Point the DMC in this case) as shown in FIGS. 6 and 7. The response is tunneled back through the web socket tunnel 731 and sent via the mirrored GENA service to the subscriber. The subscriber renews the subscription after subscription timeout occurs in the same manner. Once an event occurs in one of the services of the DMR, for example the DMR is paused, the AVTransport service sends a LasChange notification with the playing state change to PAUSE to the subscription list URI and does it directly via the XMLHttpReq object as an HTTP client.

The web browser 710 may run on a user entity 110, 210 as described above with respect to FIGS. 1 to 3. The mirrored service 720 may run on a network entity 120, 220 as described above with respect to FIGS. 1 to 3.

Figure 8:
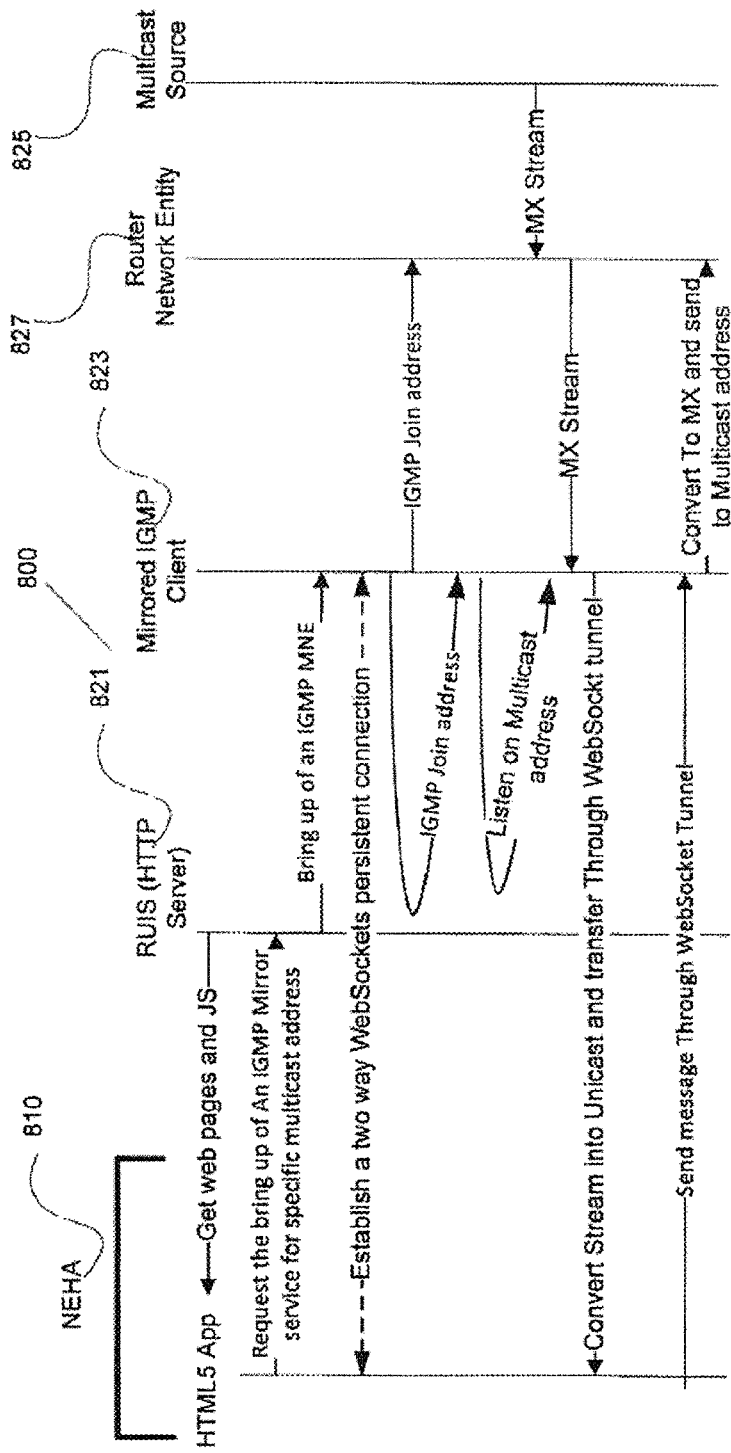
FIG. 8 illustrates a flow diagram of an exemplary implementation of an IGMP client HTML5 application using the IGMP and multicast to unicast service mirroring, in accordance with an implementation form.

FIG. 8 illustrates a flow diagram 800 of an exemplary implementation of the system when the desired network protocol is IGMP. The system comprises a NEHA 810 having a HTML5 application 811, a mirrored IGMP client 823 acting as the MITE 120, a HTTP server 821 like RUIS, and router network entity 827 acts as a NE. The NEHA 810 comprises a web browser. The HTML5 application 811 using the IGMP and multicast to unicast service mirroring, in accordance with an implementation form. FIG. 8 illustrates a NS network protocol client implementation in a HTML5 application that was not possible until now. In an implementation as depicted in FIG. 8, it is possible using a mirrored IGMP client 823 and a web socket connection. FIG. 8 shows how the HTML5 application 811 sends and listens to multicast address basically acting as an IGMP client. The HTML5 application 811 may be downloaded into the browser of the NEHA 810 and the application may initialize an IGMP client for a specific multicast address and initiate the web socket bi-directional connection. The newly initialized mirrored IGMP client 823 may join the reposed multicast address and start listening on that address. When a multicast message/stream is received to the mirrored IGMP client 823 it converts it into unicast and transfers it to the HTML5 application 811 via the established web socket tunnel. Whenever the HTML5 application 811 wants to send a multicast message it sends it in unicast via the web socket tunnel as illustrated in FIG. 8 and the mirrored IGMP client 823 converts it into multicast and sends it to the said multicast address.

The browser of the NEHA 810 may run on a user entity 110, 210 as described above with respect to FIGS. 1 to 3. The mirrored IGMP client 820 may run on a network entity 120, 220 as described above with respect to FIGS. 1 to 3.

According to FIG. 8, the following flow sequence or parts of that flow sequence may be implemented. The HTTP server 821 RUIS inside the server 820 sends a message to the HTML5 application 811 inside the browser of the NEHA 810 to get web pages and JS. The HTML5 application 811 sends a message to the RUIS 821 to request the bring-up of an IGMP mirror device for a specific multicast address which message is forwarded by the RUIS 821 to the mirrored IGMP client 823 on the server 820. A two way web sockets persistent connection is established between the HTML5 application 811 and the mirrored IGMP client 823. The IGMP join address is forwarded by the mirrored IGMP client 823 to the network entity 827. The network entity 827 receives a multicast (MX) stream. The mirrored IGMP client 823 listens on the multicast address 825 to receive the MX stream. The mirrored IGMP client 823 sends a message to the HTML5 application 811 to convert stream into unicast and transfer it through the web socket tunnel. The HTML5 application 811 sends the message to the mirrored IGMP client 823 through the web-socket tunnel which message is converted by the mirrored IGMP client 823 to MX and sent to the multicast address 825.

Figure 9:
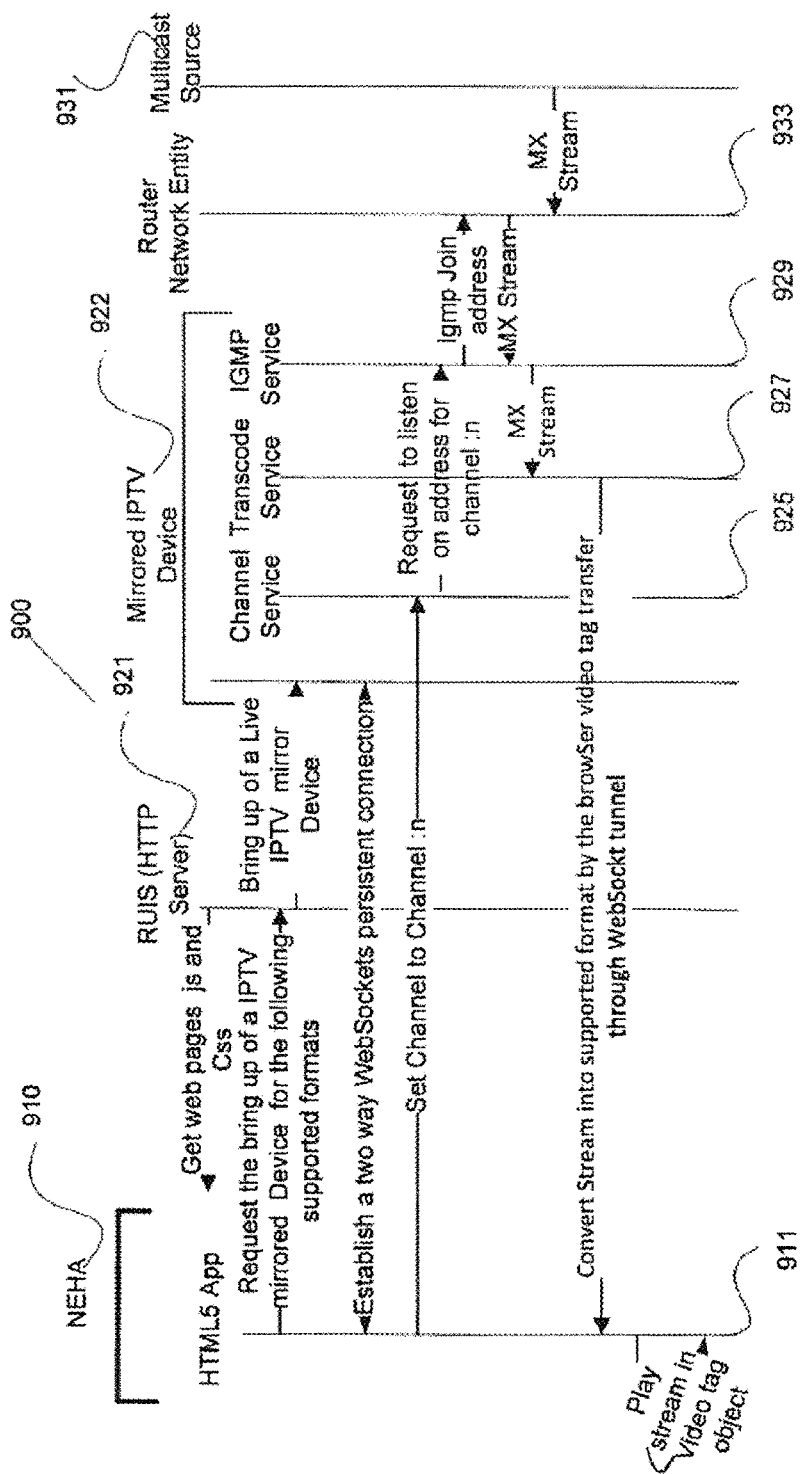
FIG. 9 illustrates a flow diagram of an exemplary implementation of an IPTV client device HTML5 application using a mirrored IPTV device in the network, in accordance with an implementation form.

FIG. 9 illustrates a flow diagram 900 of an exemplary implementation of an IPTV client device 910 having an HTML5 application 911 using a mirrored IPTV device 922 acts as an MNE 120 in the network, in accordance with an implementation form. The IPTV mirrored device 922 may be a bundle of mirrored services that allows the HTML5 application 911 to act as IPTV client. The bundles of the services in this explanatory implementation may be a mirrored channel service 925, a mirrored transcode service 927 and a mirrored IGMP service 929. FIG. 9 illustrates how the HTML5 application 911 downloads its code and HTML representation from the HTTP server RUIS (Remote User Interface server) 921 and then initializes a mirrored IPTV device 922 in the network, establishes a web socket tunnel to that service and transfers its capabilities which media format it can play in the video tag. Then, the HTML5 application 911 sets the requested channel to start with the IPTV channel mirrored service 922. The mirrored channel service connects the IGMP service and transfers the address of the requested multicast address for the specific channel. The mirrored IGMP service 922 joins the requested multicast address and starts listening on that address. The mirrored IGMP service 922 transfers the data (the video H.264 over mpeg2ts) into the mirrored transcode service that transcodes it if needed to the supported streaming protocol by the requester HTML5 application video tag. If the HTML5 application 911 specifies that it supports H.264 over mpeg2ts then there is no need to transcode and Multicast is converted to Unicast and the stream is sent via the web socket tunnel established earlier to the HTML5 application 911 that receives the stream and passes the video data into the video tag element.

The browser 910 may run on a user entity 110, 210 as described above with respect to FIGS. 1 to 3. The mirrored IPTV device 922 may run on a network entity 120, 220 as described above with respect to FIGS. 1 to 3.

Figure 10:
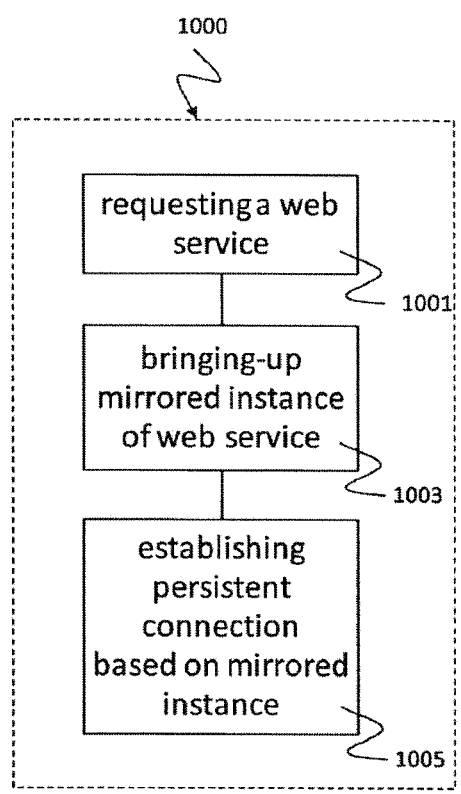
FIG. 10 shows a schematic diagram of a method for initiating a persistent connection between a user entity and a web service according to an implementation form.

FIG. 10 shows a schematic diagram of a method 1000 for initiating a persistent connection between a NEHA and a MNE 120 according to an implementation form.

The NEHA and a MNE 120 may be entities as described above with respect to FIGS. 1 to 9. The method 1000 may include requesting 1001 a web service, the requesting comprising a desired network protocol. The method 1000 may include bringing-up 1003 a mirrored instance of the web service according to the desired network protocol responsive to the requesting. The method 1000 may include establishing 1005 a persistent connection between a requestor of the web service and the web service based on the mirrored instance of the web service.

In an implementation form, the request is initiated by a HTML5 browser. In an implementation form, the persistent connection includes a web socket connection abbreviated by "ws", in particular a HTML5 web socket connection. In an implementation form, the persistent connection includes a secure link connection abbreviated by "wss", in particular an encrypted secure link connection. In an implementation form, the NEHA 110 includes a web browser configured to initiate the request for the web service. In an implementation form, the web browser includes a HTML5 application configured to initiate the request for the web service. In an implementation form, the mirrored instance of the web service is configured to act as a proxy connecting the NEHA110 to the web service through the persistent connection. In an implementation form, the mirrored instance of the web service is configured to handle at least part of the request of the client entity. In an implementation form, the mirrored instance of the web service includes a set of web services launched by the MNE 120 according to the desired network protocol. In an implementation form, the NEHA110 is configured to establish the persistent connection providing scripting language interfaces, in particular JavaScript interfaces. In an implementation form, the MNE 120 is configured to enable running an auto discovery and control device, in particular one of the following: HTML5, UPnP, Bonjour in a HTML5 application of the NEHA as described below. In an implementation form, the MNE 120 is configured to enable running a media renderer device, in particular one of a UPnP media renderer device and a DLNA digital media renderer device in a HTML5 application of the NEHA as described above. In an implementation form, the MNE 120 is configured to enable running a video client device, in particular one of an IPTV device and an IGMP device in a HTML5 application of the NEHA as described above. In an implementation form, the desired network protocol includes one of the following network protocols: HTTP, non-HTTP, SSDP, SOAP, GENA and IGMP as described above or any other network protocol not supported in W3C.

In the above implementations, the mirrored instance of the web service is also called the mirrored service.

From the foregoing, it will be apparent to those skilled in the art that a variety of methods, systems, computer programs on recording media, and the like, are provided.

The present disclosure also supports a computer program product including computer executable code or computer executable instructions that, when executed, causes at least one computer to execute the performing and computing steps described herein.

Many alternatives, modifications, and variations will be apparent to those skilled in the art in light of the above teachings. Of course, those skilled in the art readily recognize that there are numerous applications of the disclosure beyond those described herein. While the present disclosures has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

What is claimed is:

1. A Network Entity running as a HTML5 Application (NEHA) for use in a system comprising a HTTP server, a network entity (NE) and a mirror network entity (MNE), wherein the MNE is a mirror instance of the NE and a desired network protocol is run between the MNE and the NE, the NEHA comprising:
a processor configured to:
create a first request for requesting the MNE, wherein the first request indicates the desired network protocol, wherein the desired network protocol is not supported by HTML5 and is one of Internet Group Management Protocol (IGMP), Internet Protocol Television (IPTV) group protocols, or File Transfer Protocol (FTP);
send the first request to the HTTP server;
receive a first response indicating the MNE from the HTTP server;
process the first response; and
communicate with the NE through the MNE using the desired network protocol.

2. The NEHA of claim 1, wherein processor is further configured to:
send a message to the MNE;
receive a message from the MNE; and
process the message received from the MNE and create the message sent to the MNE.

3. The NEHA of claim 2, wherein when the NEHA is a client entity for requesting a first service, the NE is a server entity providing the first service, and wherein the message sent to the MNE is a second request for requesting the first service and the message received from the MNE is a second response providing the first service.

4. The NEHA of claim 3, wherein:
a HTTP protocol is run between the NEHA and the HTTP server, accordingly the first request and the first response are of the HTTP protocol; and
wherein the MNE is indicated by a network identity comprising an IP address plus a port number.

5. The NEHA of claim 2, wherein when the NEHA is a server entity for providing a second service, the NE is a client entity requesting the second service, and wherein the message received from the MNE is a third request for requesting the second service and the message sent to the MNE is a third response providing the second service.

6. The NEHA of claim 5, wherein the desired network protocol comprises at least one of: HTTP, auto discovery and control network protocol, and media auto discovery and control network protocol.

7. The NEHA of claim 1, wherein the processor is further configured to:
establish a persistent connection between the NEHA and the MNE, wherein the message sent to the MNE and the message received from the MNE are transferred over the persistent connection.

8. The NEHA of claim 1, wherein a first network protocol is run between the NEHA and the MNE.

9. The NEHA of claim 8, wherein the first network protocol comprises at least one of the desired network protocol and a private protocol.

10. A system comprising:
a Network Entity comprising a processor running a HTML5 Application (NEHA) and connected to a computer network, a hardware HTTP server connected to the computer network, a network entity (NE) connected to the computer network, and a mirror network entity (MNE) connected to the computer network, wherein the MNE is a mirror instance of the NE and a desired network protocol is run on the computer network between the MNE and the NE;
wherein the HTTP server is configured for receiving a first request for requesting the MNE from the NEHA, the first request comprising the desired network protocol, and configured for sending a first response indicating the MNE to the NEHA, wherein the desired network protocol is not supported by HTML5 and is one of Internet Group Management Protocol (IGMP), Internet Protocol Television (IPTV) group protocols, or File Transfer Protocol (FTP);
wherein the NEHA is configured for communicating with the NE through the MNE; and
wherein the MNE is configured for communicating with the NE using the desired network protocol.

11. The system of claim 10, wherein:
when the NEHA is a client entity, the NE is a server entity;
the NEHA is configured for sending a second request for requesting a first service to the MNE and for receiving a second response providing the first service from the MNE; and
the MNE is configured for sending a fourth request to the NE for requesting the first service upon the second request received from the NEHA, and for receiving a fourth response providing the first service from the NE, and for sending the second response to the NEHA based on the fourth response.

12. The system of claim 11, wherein the MNE is further configured for caching the fourth response, when a latter another request requesting the first service and indicating the desired network protocol is received, the MNE is configured for responding the latter another request directly based on the stored fourth response.

13. The system of claim 10, wherein:
when the NEHA is a server entity, the NE is a client entity;
the MNE is configured for receiving a fifth request for requesting a second service from the NE, for sending a third request for requesting the second service to the NEHA based on the fifth request, and for sending a fifth response providing the second service to the NE based on a third response providing the second service received from the NEHA; and
the NEHA is configured for receiving the third request from the MNE, and for sending the third response to the MNE based on the third request.

14. The system of claim 13, wherein the MNE is further configured for caching the third response, when a latter another request requesting the second service, the MNE is configured for responding the latter another request directly based on the stored third response.

15. The system of claim 10, wherein the MNE is further configured for communicating with the NEHA using the first network protocol, and, for converting a message sent by the NEHA from the first network protocol to the desired network protocol and for converting a message to-be-sent to the NEHA from the desired network protocol to the first network protocol, when the first network protocol and the desired network protocol are different.

16. A method implemented by a Network Entity running as a HTML5 Application (NEHA), comprising:
- creating a first request for requesting a mirror network entity (MNE), wherein the MNE is a mirror instance of a network entity (NE) and a desired network protocol is run between the MNE and the NE, the first request indicates the desired network protocol, wherein the desired network protocol is not supported by HTML5 and is one of Internet Group Management Protocol (IGMP), Internet Protocol Television (IPTV) group protocols, or File Transfer Protocol (FTP);
- sending the first request to an HTTP server;
- receiving a first response indicating the MNE from the HTTP server;
- processing the first response; and
- communicating with the NE through the MNE using the desired network protocol.

17. The method of claim 16, further comprising:
- sending a message to the MNE;
- receiving a message from the MNE; and
- processing the message received from the MNE and create the message sent to the MNE.

18. The NEHA of claim 17, wherein when the NEHA is a client entity for requesting a first service, the NE is a server entity providing the first service, and wherein the message sent to the MNE is a second request for requesting the first service and the message received from the MNE is a second response providing the first service.

19. The NEHA of claim 18, wherein:
- a HTTP protocol is run between the NEHA and the HTTP server, accordingly the first request and the first response are of the HTTP protocol; and
- wherein the MNE is indicated by a network identity comprising an IP address plus a port number.

20. The NEHA of claim 17, wherein when the NEHA is a server entity for providing a second service, the NE is a client entity requesting the second service, and wherein the message received from the MNE is a third request for requesting the second service and the message sent to the MNE is a third response providing the second service.

* * * * *